(12) United States Patent
Lockton

(10) Patent No.: US 11,722,743 B2
(45) Date of Patent: *Aug. 8, 2023

(54) SYNCHRONIZED GAMING AND PROGRAMMING

(71) Applicant: Winview, Inc., Redwood City, CA (US)

(72) Inventor: David B. Lockton, Redwood City, CA (US)

(73) Assignee: Winview, Inc., Redwood City, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/388,792

(22) Filed: Jul. 29, 2021

(65) Prior Publication Data
US 2021/0360325 A1 Nov. 18, 2021

Related U.S. Application Data

(60) Continuation of application No. 15/608,616, filed on May 30, 2017, now Pat. No. 11,082,746, which is a
(Continued)

(51) Int. Cl.
*A63F 13/332* (2014.01)
*A63F 13/335* (2014.01)
(Continued)

(52) U.S. Cl.
CPC ....... *H04N 21/4781* (2013.01); *A63F 13/332* (2014.09); *A63F 13/335* (2014.09);
(Continued)

(58) Field of Classification Search
CPC .... A63F 13/332; A63F 13/335; A63F 13/338; A63F 13/352; A63F 13/355;
(Continued)

(56) References Cited

U.S. PATENT DOCUMENTS

| 2,831,105 A | 4/1958 | Parker |
| 3,562,650 A | 2/1971 | Gossard et al. |

(Continued)

FOREIGN PATENT DOCUMENTS

| CA | 2252074 | 11/1997 |
| CA | 2252021 | 11/1998 |

(Continued)

OTHER PUBLICATIONS

Pinnacle, "The basics of reverse line movement," Jan. 19, 2018, Retrieved on Jan. 22, 2020, http://www.pinnacle.com/en/betting-articles educational/basics-of-reverse-line-movement/QAH26XGGQQS7M3GD.

(Continued)

*Primary Examiner* — David L Lewis
*Assistant Examiner* — Matthew D Hoel
(74) *Attorney, Agent, or Firm* — Haverstock & Owens, A Law Corporation

(57) ABSTRACT

To encourage viewer participation, games, contests and social interactions are able to be synchronized with programming such as television shows or commercials utilizing a second screen such as a cell phone, iPad® or laptop computer. The programming is able to be television programming, Internet programming (e.g. a video displayed on a webpage or mobile device) or any other programming. The gaming is able to be any game such as a game of skill or chance, for example, played in connection with a football telecast.

31 Claims, 7 Drawing Sheets

Related U.S. Application Data continuation-in-part of application No. 15/586,198, filed on May 3, 2017, now Pat. No. 9,919,210, which is a continuation-in-part of application No. 14/172,539, filed on Feb. 4, 2014, now Pat. No. 9,672,692, which is a division of application No. 13/484,129, filed on May 30, 2012, now Pat. No. 8,705,195, which is a continuation-in-part of application No. 13/403,845, filed on Feb. 23, 2012, now Pat. No. 8,717,701, which is a continuation of application No. 11/786,992, filed on Apr. 12, 2007, now Pat. No. 8,149,530.

(60) Provisional application No. 60/791,793, filed on Apr. 12, 2006.

(51) Int. Cl.

| | | |
|---|---|---|
| *A63F 13/338* | (2014.01) | |
| *A63F 13/352* | (2014.01) | |
| *A63F 13/355* | (2014.01) | |
| *A63F 13/358* | (2014.01) | |
| *G07F 17/32* | (2006.01) | |
| *H04L 29/06* | (2006.01) | |
| *H04N 21/478* | (2011.01) | |
| *H04L 65/401* | (2022.01) | |
| *H04L 65/611* | (2022.01) | |
| *A63F 13/46* | (2014.01) | |

(52) U.S. Cl.
CPC .......... *A63F 13/338* (2014.09); *A63F 13/352* (2014.09); *A63F 13/355* (2014.09); *A63F 13/358* (2014.09); *G07F 17/32* (2013.01); *G07F 17/3227* (2013.01); *H04L 65/4015* (2013.01); *H04L 65/611* (2022.05); *A63F 13/46* (2014.09)

(58) Field of Classification Search
CPC ........ A63F 13/358; A63F 13/46; G07F 17/32; G07F 17/3227; H04N 21/4781; H04L 65/611; H04L 65/4015
See application file for complete search history.

(56) References Cited

U.S. PATENT DOCUMENTS

| | | | |
|---|---|---|---|
| 4,141,548 A | 2/1979 | Everton | |
| 4,270,755 A | 6/1981 | Willhide et al. | |
| 4,386,377 A | 5/1983 | Hunter, Jr. | |
| 4,496,148 A | 1/1985 | Morstain et al. | |
| 4,521,803 A | 6/1985 | Glittinger | |
| 4,592,546 A | 6/1986 | Fascenda et al. | |
| 4,816,904 A | 3/1989 | McKenna et al. | |
| 4,918,603 A | 4/1990 | Hughes et al. | |
| 4,930,010 A | 5/1990 | MacDonald | |
| 5,013,038 A | 5/1991 | Luvenberg | |
| 5,018,736 A | 5/1991 | Pearson et al. | |
| 5,035,422 A | 7/1991 | Berman | |
| 5,073,931 A | 12/1991 | Audebert et al. | |
| 5,083,271 A | 1/1992 | Thatcher et al. | |
| 5,083,800 A | 1/1992 | Lockton | |
| 5,119,295 A | 6/1992 | Kapur | |
| 5,120,076 A | 6/1992 | Luxenberg et al. | |
| 5,213,337 A | 5/1993 | Sherman | |
| 5,227,874 A | 7/1993 | Von Kohom | |
| 5,256,863 A | 10/1993 | Ferguson | |
| 5,263,723 A | 11/1993 | Pearson et al. | |
| 5,283,734 A | 2/1994 | Von Kohom | |
| 5,327,485 A | 7/1994 | Leaden | |
| 5,343,236 A | 8/1994 | Koppe et al. | |
| 5,343,239 A | 8/1994 | Lappington et al. | |
| 5,417,424 A | 5/1995 | Snowden | |
| 5,462,275 A | 10/1995 | Lowe et al. | |
| 5,479,492 A | 12/1995 | Hofstee et al. | |
| 5,488,659 A | 1/1996 | Millani | |
| 5,519,433 A * | 5/1996 | Lappington | H04N 21/235 348/478 |
| 5,530,483 A | 6/1996 | Cooper | |
| 5,553,120 A | 9/1996 | Katz | |
| 5,566,291 A | 10/1996 | Boulton et al. | |
| 5,585,975 A | 12/1996 | Bliss | |
| 5,586,257 A | 12/1996 | Perlman | |
| 5,589,765 A | 12/1996 | Ohmart et al. | |
| 5,594,938 A | 1/1997 | Engel | |
| 5,618,232 A | 4/1997 | Martin | |
| 5,628,684 A | 5/1997 | Jean-Etienne | |
| 5,636,920 A | 6/1997 | Shur et al. | |
| 5,638,113 A | 6/1997 | Lappington | |
| 5,643,088 A | 7/1997 | Vaughn et al. | |
| 5,663,757 A | 9/1997 | Morales | |
| 5,759,101 A | 6/1998 | Von Kohom | |
| 5,761,606 A | 6/1998 | Wolzien | |
| 5,762,552 A | 6/1998 | Voung et al. | |
| 5,764,275 A * | 6/1998 | Lappington | H04N 21/4722 725/136 |
| 5,794,210 A | 8/1998 | Goldhaber et al. | |
| 5,805,230 A | 9/1998 | Staron | |
| 5,813,913 A | 9/1998 | Berner et al. | |
| 5,818,438 A | 10/1998 | Howe et al. | |
| 5,828,843 A * | 10/1998 | Grimm | G06F 9/5044 709/204 |
| 5,838,774 A | 11/1998 | Weiser, Jr. | |
| 5,838,909 A * | 11/1998 | Roy | H04L 9/40 709/209 |
| 5,846,132 A | 12/1998 | Junkin | |
| 5,848,397 A | 12/1998 | Marsh et al. | |
| 5,860,862 A | 1/1999 | Junkin | |
| 5,894,556 A * | 4/1999 | Grimm | G06F 9/5044 709/227 |
| 5,916,024 A | 6/1999 | Von Kohom | |
| 5,870,683 A | 9/1999 | Wells et al. | |
| 5,970,143 A | 10/1999 | Schneier et al. | |
| 5,971,854 A | 10/1999 | Pearson et al. | |
| 5,987,440 A | 11/1999 | O'Neil et al. | |
| 6,009,458 A | 12/1999 | Hawkins et al. | |
| 6,015,344 A | 1/2000 | Kelly et al. | |
| 6,016,337 A | 1/2000 | Pykalisto | |
| 6,038,599 A * | 3/2000 | Black | H04L 43/00 709/223 |
| 6,042,477 A * | 3/2000 | Addink | G06F 1/14 713/375 |
| 6,064,449 A | 5/2000 | White | |
| 6,104,815 A | 8/2000 | Alcorn et al. | |
| 6,110,041 A | 8/2000 | Walker et al. | |
| 6,117,013 A | 9/2000 | Elba | |
| 6,126,543 A | 10/2000 | Friedman | |
| 6,128,660 A * | 10/2000 | Grimm | H04L 43/00 709/227 |
| 6,135,881 A | 10/2000 | Abbott et al. | |
| 6,154,131 A | 11/2000 | Jones, II | |
| 6,174,237 B1 | 1/2001 | Stephenson | |
| 6,182,084 B1 | 1/2001 | Cockrell et al. | |
| 6,193,610 B1 | 2/2001 | Junkin | |
| 6,222,642 B1 | 4/2001 | Farrell et al. | |
| 6,233,736 B1 | 5/2001 | Wolzien | |
| 6,251,017 B1 | 6/2001 | Leason et al. | |
| 6,267,670 B1 | 7/2001 | Walker | |
| 6,287,199 B1 | 9/2001 | McKeown et al. | |
| 6,293,868 B1 | 9/2001 | Bernard | |
| 6,312,336 B1 | 11/2001 | Handelman et al. | |
| 6,343,320 B1 * | 1/2002 | Fairchild | H04L 41/0213 709/224 |
| 6,345,297 B1 * | 2/2002 | Grimm | G06F 9/5055 709/227 |
| 6,371,855 B1 | 4/2002 | Gavriloff | |
| 6,373,462 B1 | 4/2002 | Pan | |
| 6,411,969 B1 | 6/2002 | Tam | |
| 6,416,414 B1 | 7/2002 | Stadelmann | |
| 6,418,298 B1 | 7/2002 | Sonnenfeld | |
| 6,425,828 B2 | 7/2002 | Walker et al. | |
| 6,434,398 B1 | 8/2002 | Inselberg | |
| 6,446,262 B1 | 9/2002 | Malaure et al. | |

(56) References Cited

U.S. PATENT DOCUMENTS

| | | | |
|---|---|---|---|
| 6,470,180 B1 | 10/2002 | Kotzin et al. | |
| 6,475,090 B2 * | 11/2002 | Roelofs | A63F 13/358 463/1 |
| 6,524,189 B1 | 2/2003 | Rautila | |
| 6,527,641 B1 | 3/2003 | Sinclair et al. | |
| 6,530,082 B1 | 3/2003 | Del Sesto et al. | |
| 6,536,037 B1 | 3/2003 | Guheen et al. | |
| 6,578,068 B1 | 6/2003 | Bowma-Amuah | |
| 6,594,098 B1 | 7/2003 | Sutardja | |
| 6,604,997 B2 | 7/2003 | Saidakovsky et al. | |
| 6,610,953 B1 | 8/2003 | Tao et al. | |
| 6,611,755 B1 | 8/2003 | Coffee | |
| 6,648,760 B1 | 11/2003 | Nicastro | |
| 6,659,860 B1 | 12/2003 | Yamamoto et al. | |
| 6,659,861 B1 * | 12/2003 | Faris | H04L 65/1101 463/29 |
| 6,659,872 B1 | 12/2003 | Kaufman et al. | |
| 6,690,661 B1 | 2/2004 | Agarwal et al. | |
| 6,697,869 B1 * | 2/2004 | Mallart | H04N 21/234318 348/E7.083 |
| 6,718,350 B1 | 4/2004 | Karbowski | |
| 6,752,396 B2 | 6/2004 | Smith | |
| 6,758,754 B1 | 7/2004 | Lavanchy et al. | |
| 6,758,755 B2 | 7/2004 | Kelly et al. | |
| 6,760,595 B2 | 7/2004 | Insellberg | |
| 6,763,377 B1 | 7/2004 | Balknap et al. | |
| 6,766,524 B1 | 7/2004 | Matheny et al. | |
| 6,774,926 B1 | 8/2004 | Ellis et al. | |
| 6,785,561 B1 | 8/2004 | Kim | |
| 6,801,380 B1 | 10/2004 | Saturdja | |
| 6,806,889 B1 | 10/2004 | Malaure et al. | |
| 6,807,675 B1 | 10/2004 | Millard et al. | |
| 6,811,482 B2 | 11/2004 | Letovsky | |
| 6,811,487 B2 * | 11/2004 | Sengoku | A63F 13/358 709/200 |
| 6,816,628 B1 | 11/2004 | Sarachik et al. | |
| 6,817,947 B2 | 11/2004 | Tanskanen | |
| 6,824,469 B2 | 11/2004 | Allibhoy et al. | |
| 6,837,789 B2 | 1/2005 | Garahi et al. | |
| 6,837,791 B1 | 1/2005 | McNutt et al. | |
| 6,840,861 B2 | 1/2005 | Jordan et al. | |
| 6,845,389 B1 * | 1/2005 | Sen | A63F 13/12 709/204 |
| 6,846,239 B2 | 1/2005 | Washio | |
| 6,857,122 B1 | 2/2005 | Takeda et al. | |
| 6,863,610 B2 | 3/2005 | Vancraeynest | |
| 6,870,720 B2 | 3/2005 | Iwata et al. | |
| 6,871,226 B1 | 3/2005 | Ensley et al. | |
| 6,873,610 B1 | 3/2005 | Noever | |
| 6,884,166 B2 | 4/2005 | Leen et al. | |
| 6,884,172 B1 | 4/2005 | Lloyd et al. | |
| 6,887,159 B2 | 5/2005 | Leen et al. | |
| 6,888,929 B1 | 5/2005 | Saylor | |
| 6,893,347 B1 | 5/2005 | Zilliacus et al. | |
| 6,898,762 B2 | 5/2005 | Ellis et al. | |
| 6,899,628 B2 | 5/2005 | Leen et al. | |
| 6,903,681 B2 * | 6/2005 | Faris | H04L 69/28 342/357.4 |
| 6,908,389 B1 | 6/2005 | Puskala | |
| 6,942,574 B1 | 9/2005 | LeMay et al. | |
| 6,944,228 B1 | 9/2005 | Dakss et al. | |
| 6,960,088 B1 | 11/2005 | Long | |
| 6,978,053 B1 | 12/2005 | Sarachik et al. | |
| 7,001,279 B1 | 2/2006 | Barber et al. | |
| 7,029,394 B2 | 4/2006 | Leen et al. | |
| 7,035,626 B1 | 4/2006 | Luciano, Jr. | |
| 7,035,653 B2 | 4/2006 | Simon et al. | |
| 7,058,592 B1 | 6/2006 | Heckerman et al. | |
| 7,076,434 B1 | 7/2006 | Newman et al. | |
| 7,085,552 B2 | 8/2006 | Buckley | |
| 7,116,310 B1 | 10/2006 | Evans et al. | |
| 7,117,517 B1 | 10/2006 | Milazzo et al. | |
| 7,120,924 B1 | 10/2006 | Katcher et al. | |
| 7,124,410 B2 * | 10/2006 | Berg | G06F 9/544 710/309 |
| 7,125,336 B2 | 10/2006 | Anttila et al. | |
| 7,136,871 B2 | 11/2006 | Ozer et al. | |
| 7,144,011 B2 | 12/2006 | Asher et al. | |
| 7,169,050 B1 | 1/2007 | Tyler | |
| 7,185,355 B1 | 2/2007 | Ellis | |
| 7,187,658 B2 * | 3/2007 | Koyanagi | H04L 12/5692 370/254 |
| 7,191,447 B1 | 3/2007 | Ellis et al. | |
| 7,192,352 B2 | 3/2007 | Walker et al. | |
| 7,194,758 B1 | 3/2007 | Waki et al. | |
| 7,228,349 B2 | 6/2007 | Barone, Jr. et al. | |
| 7,231,630 B2 | 6/2007 | Acott et al. | |
| 7,233,922 B2 | 6/2007 | Asher et al. | |
| 7,240,093 B1 | 7/2007 | Danieli et al. | |
| 7,244,181 B2 * | 7/2007 | Wang | G06Q 30/00 463/42 |
| 7,249,367 B2 | 7/2007 | Bove, Jr. et al. | |
| 7,254,605 B1 | 8/2007 | Strum | |
| 7,260,782 B2 | 8/2007 | Wallace et al. | |
| RE39,818 E | 9/2007 | Slifer | |
| 7,283,830 B2 | 10/2007 | Buckley | |
| 7,288,027 B2 | 10/2007 | Overton | |
| 7,341,517 B2 | 3/2008 | Asher et al. | |
| 7,343,617 B1 | 3/2008 | Kartcher et al. | |
| 7,347,781 B2 | 3/2008 | Schultz | |
| 7,351,149 B1 | 4/2008 | Simon et al. | |
| 7,367,042 B1 | 4/2008 | Dakss et al. | |
| 7,379,705 B1 | 5/2008 | Rados et al. | |
| 7,389,144 B1 | 6/2008 | Osorio | |
| 7,430,718 B2 | 9/2008 | Gariepy-Viles | |
| 7,452,273 B2 | 11/2008 | Amaitis et al. | |
| 7,460,037 B2 | 12/2008 | Cattone et al. | |
| 7,461,067 B2 | 12/2008 | Dewing et al. | |
| 7,502,610 B2 | 3/2009 | Maher | |
| 7,510,474 B2 | 3/2009 | Carter, Sr. | |
| 7,517,282 B1 | 4/2009 | Pryor | |
| 7,534,169 B2 | 5/2009 | Amaitis et al. | |
| 7,543,052 B1 * | 6/2009 | Cesa Klein | H04L 47/2483 709/224 |
| 7,562,134 B1 | 7/2009 | Fingerhut et al. | |
| 7,602,808 B2 * | 10/2009 | Ullmann | H04L 43/0894 370/468 |
| 7,610,330 B1 * | 10/2009 | Quinn | H04L 45/02 709/201 |
| 7,614,944 B1 | 11/2009 | Hughes et al. | |
| 7,630,986 B1 | 12/2009 | Herz et al. | |
| 7,693,781 B2 | 4/2010 | Asher et al. | |
| 7,699,707 B2 | 4/2010 | Bahou | |
| 7,702,723 B2 * | 4/2010 | Dyl | A63F 13/35 709/200 |
| 7,711,628 B2 | 5/2010 | Davie et al. | |
| 7,729,286 B2 * | 6/2010 | Mishra | H04Q 3/0054 370/254 |
| 7,753,772 B1 | 7/2010 | Walker | |
| 7,753,789 B2 | 7/2010 | Walker et al. | |
| 7,780,528 B2 | 8/2010 | Hirayama | |
| 7,828,661 B1 | 11/2010 | Fish | |
| 7,835,961 B2 | 11/2010 | Davie et al. | |
| 7,860,993 B2 * | 12/2010 | Chintala | H04L 65/612 709/214 |
| 7,886,003 B2 | 2/2011 | Newman | |
| 7,907,211 B2 | 3/2011 | Oostveen et al. | |
| 7,907,598 B2 * | 3/2011 | Anisimov | H04M 3/523 370/352 |
| 7,909,332 B2 | 3/2011 | Root | |
| 7,925,756 B1 * | 4/2011 | Riddle | H04L 47/10 718/104 |
| 7,926,810 B2 | 4/2011 | Fisher et al. | |
| 7,937,318 B2 | 5/2011 | Davie et al. | |
| 7,941,482 B2 * | 5/2011 | Bates | H04L 67/1001 709/201 |
| 7,941,804 B1 * | 5/2011 | Herington | G06F 9/5083 718/104 |
| 7,976,389 B2 | 7/2011 | Cannon et al. | |
| 8,002,618 B1 | 8/2011 | Lockton et al. | |
| 8,006,314 B2 | 8/2011 | Wold | |

(56) References Cited

U.S. PATENT DOCUMENTS

| | | |
|---|---|---|
| 8,025,565 B2 | 9/2011 | Leen et al. |
| 8,028,315 B1 | 9/2011 | Barber |
| 8,082,150 B2 | 12/2011 | Wold |
| 8,086,445 B2 | 12/2011 | Wold et al. |
| 8,086,510 B2 | 12/2011 | Amaitis et al. |
| 8,092,303 B2 | 1/2012 | Amaitis et al. |
| 8,092,306 B2 | 1/2012 | Root |
| 8,105,141 B2 | 1/2012 | Leen et al. |
| 8,107,674 B2 | 1/2012 | Davis et al. |
| 8,109,827 B2 | 2/2012 | Cahill et al. |
| 8,128,474 B2 | 3/2012 | Amaitis et al. |
| 8,147,313 B2 | 4/2012 | Amaitis et al. |
| 8,147,373 B2 | 4/2012 | Amaitis et al. |
| 8,149,530 B1 | 4/2012 | Lockton et al. |
| 8,155,637 B2 * | 4/2012 | Fujisawa .............. G06Q 10/087 273/237 |
| 8,162,759 B2 * | 4/2012 | Yamaguchi ............ A63F 13/31 463/40 |
| 8,176,518 B1 | 5/2012 | Junkin et al. |
| 8,186,682 B2 | 5/2012 | Amaitis et al. |
| 8,204,808 B2 | 6/2012 | Amaitis et al. |
| 8,219,617 B2 * | 7/2012 | Ashida .................. A63F 13/795 709/205 |
| 8,240,669 B2 | 8/2012 | Asher et al. |
| 8,246,048 B2 | 8/2012 | Amaitis et al. |
| 8,267,403 B2 | 9/2012 | Fisher et al. |
| 8,342,924 B2 | 1/2013 | Leen et al. |
| 8,342,942 B2 | 1/2013 | Amaitis et al. |
| 8,353,763 B2 | 1/2013 | Amaitis et al. |
| 8,376,855 B2 | 2/2013 | Lockton et al. |
| 8,396,001 B2 | 3/2013 | Jung |
| 8,397,257 B1 | 3/2013 | Barber |
| 8,465,021 B2 | 6/2013 | Asher et al. |
| 8,473,393 B2 | 6/2013 | Davie et al. |
| 8,474,819 B2 | 7/2013 | Asher et al. |
| 8,535,138 B2 | 9/2013 | Amaitis et al. |
| 8,538,563 B1 | 9/2013 | Barber |
| 8,543,487 B2 | 9/2013 | Asher et al. |
| 8,555,313 B2 | 10/2013 | Newman |
| 8,556,691 B2 | 10/2013 | Leen et al. |
| 8,585,490 B2 | 11/2013 | Amaitis et al. |
| 8,622,798 B2 | 1/2014 | Lockton et al. |
| 8,632,392 B2 | 1/2014 | Shore et al. |
| 8,634,943 B2 | 1/2014 | Root |
| 8,638,517 B2 | 1/2014 | Lockton et al. |
| 8,641,511 B2 | 2/2014 | Ginsberg et al. |
| 8,659,848 B2 | 2/2014 | Lockton et al. |
| 8,672,751 B2 | 3/2014 | Leen et al. |
| 8,699,168 B2 | 4/2014 | Lockton et al. |
| 8,705,195 B2 | 4/2014 | Lockton |
| 8,708,789 B2 | 4/2014 | Asher et al. |
| 8,717,701 B2 | 5/2014 | Lockton et al. |
| 8,727,352 B2 | 5/2014 | Amaitis et al. |
| 8,734,227 B2 | 5/2014 | Leen et al. |
| 8,737,004 B2 | 5/2014 | Lockton et al. |
| 8,738,694 B2 | 5/2014 | Huske et al. |
| 8,771,058 B2 | 7/2014 | Alderucci et al. |
| 8,780,482 B2 | 7/2014 | Lockton et al. |
| 8,805,732 B2 | 8/2014 | Davie et al. |
| 8,813,112 B1 | 8/2014 | Cibula et al. |
| 8,814,664 B2 | 8/2014 | Amaitis et al. |
| 8,817,408 B2 | 8/2014 | Lockton et al. |
| 8,837,072 B2 | 9/2014 | Lockton et al. |
| 8,849,225 B1 | 9/2014 | Choti |
| 8,849,255 B2 | 9/2014 | Choti |
| 8,858,313 B1 | 10/2014 | Selfors |
| 8,870,639 B2 | 10/2014 | Lockton et al. |
| 8,935,715 B2 | 1/2015 | Cibula et al. |
| 9,056,251 B2 | 6/2015 | Lockton |
| 9,067,143 B2 | 6/2015 | Lockton et al. |
| 9,069,651 B2 | 6/2015 | Barber |
| 9,076,303 B1 | 7/2015 | Park |
| 9,098,883 B2 | 8/2015 | Asher et al. |
| 9,111,417 B2 | 8/2015 | Leen et al. |
| 9,205,339 B2 | 12/2015 | Cibula et al. |
| 9,233,293 B2 | 1/2016 | Lockton |
| 9,258,601 B2 | 2/2016 | Lockton et al. |
| 9,270,789 B2 | 2/2016 | Huske et al. |
| 9,289,692 B2 | 3/2016 | Barber |
| 9,306,952 B2 | 4/2016 | Burman et al. |
| 9,314,686 B2 | 4/2016 | Lockton |
| 9,314,701 B2 | 4/2016 | Lockton et al. |
| 9,355,518 B2 | 5/2016 | Amaitis et al. |
| 9,406,189 B2 | 8/2016 | Scott et al. |
| 9,430,901 B2 | 8/2016 | Amaitis et al. |
| 9,457,272 B2 | 10/2016 | Lockton et al. |
| 9,498,724 B2 | 11/2016 | Lockton et al. |
| 9,501,904 B2 | 11/2016 | Lockton |
| 9,504,922 B2 | 11/2016 | Lockton et al. |
| 9,511,287 B2 | 12/2016 | Lockton et al. |
| 9,526,991 B2 | 12/2016 | Lockton et al. |
| 9,536,396 B2 | 1/2017 | Amaitis et al. |
| 9,556,991 B2 | 1/2017 | Furuya |
| 9,604,140 B2 | 3/2017 | Lockton et al. |
| 9,652,937 B2 | 5/2017 | Lockton |
| 9,662,576 B2 | 5/2017 | Lockton et al. |
| 9,662,577 B2 | 5/2017 | Lockton et al. |
| 9,672,692 B2 | 6/2017 | Lockton |
| 9,687,738 B2 | 6/2017 | Lockton et al. |
| 9,687,739 B2 | 6/2017 | Lockton et al. |
| 9,707,482 B2 | 7/2017 | Lockton et al. |
| 9,716,918 B1 | 7/2017 | Lockton et al. |
| 9,724,603 B2 | 8/2017 | Lockton et al. |
| 9,744,453 B2 | 8/2017 | Lockton et al. |
| 9,805,549 B2 | 10/2017 | Asher et al. |
| 9,821,233 B2 | 11/2017 | Lockton et al. |
| 9,878,243 B2 | 1/2018 | Lockton et al. |
| 9,881,337 B2 | 1/2018 | Jaycob et al. |
| 9,901,820 B2 | 2/2018 | Lockton et al. |
| 9,908,053 B2 | 3/2018 | Lockton et al. |
| 9,919,210 B2 | 3/2018 | Lockton |
| 9,919,211 B2 | 3/2018 | Lockton et al. |
| 9,919,221 B2 | 3/2018 | Lockton et al. |
| 9,978,217 B2 | 5/2018 | Lockton |
| 9,993,730 B2 | 6/2018 | Lockton et al. |
| 9,999,834 B2 | 6/2018 | Lockton et al. |
| 10,052,557 B2 | 8/2018 | Lockton et al. |
| 10,089,815 B2 | 10/2018 | Asher et al. |
| 10,096,210 B2 | 10/2018 | Amaitis et al. |
| 10,137,369 B2 | 11/2018 | Lockton et al. |
| 10,150,031 B2 | 12/2018 | Lockton et al. |
| 10,165,339 B2 | 12/2018 | Huske et al. |
| 10,186,116 B2 | 1/2019 | Lockton |
| 10,195,526 B2 | 2/2019 | Lockton et al. |
| 10,226,698 B1 | 3/2019 | Lockton et al. |
| 10,226,705 B2 | 3/2019 | Lockton et al. |
| 10,232,270 B2 | 3/2019 | Lockton et al. |
| 10,248,290 B2 | 4/2019 | Galfond |
| 10,279,253 B2 | 5/2019 | Lockton |
| 10,360,767 B2 | 7/2019 | Russell et al. |
| 10,569,175 B2 | 2/2020 | Kosai et al. |
| 10,653,955 B2 | 5/2020 | Lockton |
| 10,695,672 B2 | 6/2020 | Lockton et al. |
| 10,709,987 B2 | 7/2020 | Lockton et al. |
| 10,721,543 B2 | 7/2020 | Huske et al. |
| 10,981,070 B2 | 4/2021 | Isgreen |
| 2001/0004609 A1 | 6/2001 | Walker et al. |
| 2001/0005670 A1 | 6/2001 | Lahtinen |
| 2001/0013067 A1 * | 8/2001 | Koyanagi ............ H04L 45/302 709/230 |
| 2001/0013125 A1 | 8/2001 | Kitsukawa et al. |
| 2001/0020298 A1 | 9/2001 | Rector, Jr. et al. |
| 2001/0032333 A1 | 10/2001 | Flickinger |
| 2001/0036272 A1 | 11/2001 | Hirayama |
| 2001/0036853 A1 | 11/2001 | Thomas |
| 2001/0044339 A1 * | 11/2001 | Cordero ................ A63F 13/31 463/40 |
| 2001/0054019 A1 | 12/2001 | de Fabrega |
| 2002/0010789 A1 | 1/2002 | Lord |
| 2002/0018477 A1 * | 2/2002 | Katz ................... H04L 12/6418 370/468 |
| 2002/0026321 A1 * | 2/2002 | Faris ..................... A63F 13/216 705/311 |
| 2002/0029381 A1 | 3/2002 | Inselberg |

(56) References Cited

U.S. PATENT DOCUMENTS

| | | |
|---|---|---|
| 2002/0035609 A1 | 3/2002 | Lessard |
| 2002/0037766 A1 | 3/2002 | Muniz |
| 2002/0069265 A1 | 3/2002 | Bountour |
| 2002/0042293 A1 | 4/2002 | Ubale et al. |
| 2002/0046099 A1 | 4/2002 | Frengut et al. |
| 2002/0054088 A1 | 5/2002 | Tanskanen et al. |
| 2002/0055385 A1 | 5/2002 | Otsu |
| 2002/0056089 A1 | 5/2002 | Houston |
| 2002/0059094 A1 | 5/2002 | Hosea et al. |
| 2002/0059623 A1 | 5/2002 | Rodriguez et al. |
| 2002/0069076 A1* | 6/2002 | Faris ............ H04L 63/12 342/357.4 |
| 2002/0076084 A1* | 6/2002 | Tian ............ H04N 21/4425 348/E17.003 |
| 2002/0078176 A1 | 6/2002 | Nomura et al. |
| 2002/0083461 A1* | 6/2002 | Hutcheson ............ A63F 13/35 725/62 |
| 2002/0091833 A1* | 7/2002 | Grimm ............ G06F 9/5055 709/200 |
| 2002/0094869 A1 | 7/2002 | Harkham |
| 2002/0095333 A1 | 7/2002 | Jokinen et al. |
| 2002/0097983 A1 | 7/2002 | Wallace et al. |
| 2002/0099709 A1 | 7/2002 | Wallace |
| 2002/0100063 A1 | 7/2002 | Herigstad et al. |
| 2002/0103696 A1 | 8/2002 | Huang et al. |
| 2002/0105535 A1 | 8/2002 | Wallace et al. |
| 2002/0107073 A1 | 8/2002 | Binney |
| 2002/0108112 A1 | 8/2002 | Wallace et al. |
| 2002/0108125 A1 | 8/2002 | Joao |
| 2002/0108127 A1 | 8/2002 | Lew et al. |
| 2002/0112249 A1 | 8/2002 | Hendricks et al. |
| 2002/0115488 A1 | 8/2002 | Berry et al. |
| 2002/0119821 A1* | 8/2002 | Sen ............ H04L 12/185 463/42 |
| 2002/0120930 A1 | 8/2002 | Yona |
| 2002/0124247 A1 | 9/2002 | Houghton |
| 2002/0132614 A1 | 9/2002 | Vanlujit et al. |
| 2002/0133817 A1 | 9/2002 | Markel |
| 2002/0133827 A1 | 9/2002 | Newman et al. |
| 2002/0142843 A1* | 10/2002 | Roelofs ............ A63F 13/10 463/42 |
| 2002/0144273 A1 | 10/2002 | Reto |
| 2002/0147049 A1 | 10/2002 | Carter, Sr. |
| 2002/0157002 A1 | 10/2002 | Messerges et al. |
| 2002/0157005 A1* | 10/2002 | Brunk ............ G06T 1/0071 713/176 |
| 2002/0159576 A1 | 10/2002 | Adams |
| 2002/0162031 A1 | 10/2002 | Levin et al. |
| 2002/0162117 A1 | 10/2002 | Pearson |
| 2002/0165020 A1 | 11/2002 | Koyama |
| 2002/0165025 A1 | 11/2002 | Kawahara |
| 2002/0177483 A1 | 11/2002 | Cannon |
| 2002/0184624 A1 | 12/2002 | Spencer |
| 2002/0187825 A1 | 12/2002 | Tracy |
| 2002/0198050 A1 | 12/2002 | Patchen |
| 2003/0002638 A1 | 1/2003 | Kaars |
| 2003/0003997 A1 | 1/2003 | Vuong et al. |
| 2003/0013528 A1 | 1/2003 | Allibhoy et al. |
| 2003/0023547 A1 | 1/2003 | France |
| 2003/0040363 A1 | 2/2003 | Sandberg |
| 2003/0054885 A1 | 3/2003 | Pinto et al. |
| 2003/0060247 A1 | 3/2003 | Goldberg et al. |
| 2003/0066089 A1 | 4/2003 | Anderson |
| 2003/0069828 A1 | 4/2003 | Blazey et al. |
| 2003/0070174 A1 | 4/2003 | Solomon |
| 2003/0078924 A1 | 4/2003 | Liechty et al. |
| 2003/0086691 A1 | 5/2003 | Yu |
| 2003/0087652 A1 | 5/2003 | Simon et al. |
| 2003/0088648 A1 | 5/2003 | Bellaton |
| 2003/0114224 A1 | 6/2003 | Anttila et al. |
| 2003/0115152 A1 | 6/2003 | Flaherty |
| 2003/0125109 A1 | 7/2003 | Green |
| 2003/0134678 A1 | 7/2003 | Tanaka |
| 2003/0144017 A1 | 7/2003 | Inselberg |
| 2003/0154242 A1 | 8/2003 | Hayes et al. |
| 2003/0165241 A1 | 9/2003 | Fransdonk |
| 2003/0177167 A1 | 9/2003 | Laage et al. |
| 2003/0177504 A1 | 9/2003 | Paulo et al. |
| 2003/0189668 A1 | 10/2003 | Newman et al. |
| 2003/0195023 A1 | 10/2003 | Di Cesare |
| 2003/0195807 A1 | 10/2003 | Maggio |
| 2003/0208579 A1 | 11/2003 | Brady et al. |
| 2003/0211856 A1 | 11/2003 | Zilliacus |
| 2003/0212691 A1 | 11/2003 | Kuntala et al. |
| 2003/0216185 A1 | 11/2003 | Varley |
| 2003/0216857 A1 | 11/2003 | Feldman et al. |
| 2003/0228866 A1 | 12/2003 | Pezeshki |
| 2003/0233425 A1 | 12/2003 | Lyons et al. |
| 2004/0005919 A1 | 1/2004 | Walker et al. |
| 2004/0014524 A1 | 1/2004 | Pearlman |
| 2004/0015442 A1 | 1/2004 | Hmlinen |
| 2004/0022366 A1 | 2/2004 | Ferguson et al. |
| 2004/0025190 A1 | 2/2004 | McCalla |
| 2004/0056897 A1 | 3/2004 | Ueda |
| 2004/0060063 A1 | 3/2004 | Russ et al. |
| 2004/0073915 A1 | 4/2004 | Dureau |
| 2004/0088729 A1 | 5/2004 | Petrovic et al. |
| 2004/0093302 A1 | 5/2004 | Baker et al. |
| 2004/0152454 A1 | 5/2004 | Kauppinen |
| 2004/0107138 A1 | 6/2004 | Maggio |
| 2004/0117831 A1 | 6/2004 | Ellis et al. |
| 2004/0117839 A1 | 6/2004 | Watson et al. |
| 2004/0128319 A1 | 7/2004 | Davis et al. |
| 2004/0139158 A1* | 7/2004 | Datta ............ H04L 67/131 709/205 |
| 2004/0139482 A1 | 7/2004 | Hale |
| 2004/0148638 A1 | 7/2004 | Weisman et al. |
| 2004/0152517 A1 | 8/2004 | Haedisty |
| 2004/0152519 A1* | 8/2004 | Wang ............ G06Q 30/00 463/42 |
| 2004/0158855 A1 | 8/2004 | Gu et al. |
| 2004/0162124 A1 | 8/2004 | Barton et al. |
| 2004/0166873 A1* | 8/2004 | Simic ............ H04W 64/00 455/423 |
| 2004/0176162 A1 | 9/2004 | Rothschild |
| 2004/0178923 A1 | 9/2004 | Kuang |
| 2004/0183824 A1 | 9/2004 | Benson |
| 2004/0185881 A1 | 9/2004 | Lee |
| 2004/0190779 A1 | 9/2004 | Sarachik et al. |
| 2004/0198495 A1 | 10/2004 | Cisneros et al. |
| 2004/0201626 A1* | 10/2004 | Lavoie ............ A63F 13/358 715/756 |
| 2004/0203667 A1 | 10/2004 | Shroder |
| 2004/0203898 A1 | 10/2004 | Bodin et al. |
| 2004/0210507 A1 | 10/2004 | Asher et al. |
| 2004/0215756 A1* | 10/2004 | VanAntwerp ............ A63F 13/795 709/238 |
| 2004/0216161 A1 | 10/2004 | Barone, Jr. et al. |
| 2004/0216171 A1 | 10/2004 | Barone, Jr. et al. |
| 2004/0224750 A1 | 11/2004 | Ai-Ziyoud |
| 2004/0242321 A1 | 12/2004 | Overton |
| 2004/0266513 A1 | 12/2004 | Odom |
| 2005/0005303 A1 | 1/2005 | Barone, Jr. et al. |
| 2005/0021942 A1 | 1/2005 | Diehl et al. |
| 2005/0026699 A1 | 2/2005 | Kinzer et al. |
| 2005/0028208 A1 | 2/2005 | Ellis |
| 2005/0043094 A1 | 2/2005 | Nguyen et al. |
| 2005/0076371 A1 | 4/2005 | Nakamura |
| 2005/0077997 A1 | 4/2005 | Landram |
| 2005/0060219 A1 | 5/2005 | Ditering et al. |
| 2005/0097599 A1 | 5/2005 | Potnick et al. |
| 2005/0101309 A1 | 5/2005 | Croome |
| 2005/0113164 A1 | 5/2005 | Buecheler et al. |
| 2005/0003878 A1 | 6/2005 | Updike |
| 2005/0131984 A1 | 6/2005 | Hofmann et al. |
| 2005/0138668 A1 | 6/2005 | Gray et al. |
| 2005/0144102 A1 | 6/2005 | Johnson |
| 2005/0155083 A1 | 7/2005 | Oh |
| 2005/0177861 A1 | 8/2005 | Ma et al. |
| 2005/0210526 A1 | 9/2005 | Levy et al. |
| 2005/0216838 A1 | 9/2005 | Graham |
| 2005/0235043 A1 | 10/2005 | Teodosiu et al. |
| 2005/0239551 A1 | 10/2005 | Griswold |

(56) References Cited

U.S. PATENT DOCUMENTS

| | | |
|---|---|---|
| 2005/0255901 A1 | 11/2005 | Kreutzer |
| 2005/0256895 A1* | 11/2005 | Dussault ............... A63F 13/12 707/999.102 |
| 2005/0266869 A1 | 12/2005 | Jung |
| 2005/0267969 A1 | 12/2005 | Poikselka et al. |
| 2005/0273804 A1 | 12/2005 | Preisman |
| 2005/0283800 A1 | 12/2005 | Ellis et al. |
| 2005/0288080 A1 | 12/2005 | Lockton et al. |
| 2005/0288101 A1 | 12/2005 | Lockton et al. |
| 2005/0288812 A1 | 12/2005 | Cheng |
| 2006/0020700 A1* | 1/2006 | Qiu ........................ H04L 47/15 709/224 |
| 2006/0025070 A1 | 2/2006 | Kim et al. |
| 2006/0046810 A1 | 3/2006 | Tabata |
| 2006/0047772 A1 | 3/2006 | Crutcher |
| 2006/0053390 A1 | 3/2006 | Gariepy-Viles |
| 2006/0058103 A1* | 3/2006 | Danieli ................... A63F 13/87 463/42 |
| 2006/0059161 A1 | 3/2006 | Millett et al. |
| 2006/0063590 A1 | 3/2006 | Abassi et al. |
| 2006/0082068 A1 | 4/2006 | Patchen |
| 2006/0087585 A1 | 4/2006 | Seo |
| 2006/0089199 A1 | 4/2006 | Jordan et al. |
| 2006/0094409 A1 | 5/2006 | Inselberg |
| 2006/0101492 A1 | 5/2006 | Lowcock |
| 2006/0111168 A1 | 5/2006 | Nguyen |
| 2006/0135253 A1 | 6/2006 | George et al. |
| 2006/0148569 A1 | 7/2006 | Beck |
| 2006/0156371 A1 | 7/2006 | Maetz et al. |
| 2006/0160597 A1 | 7/2006 | Wright |
| 2006/0174307 A1 | 8/2006 | Hwang et al. |
| 2006/0183547 A1 | 8/2006 | McMonigle |
| 2006/0183548 A1 | 8/2006 | Morris et al. |
| 2006/0190654 A1* | 8/2006 | Joy ....................... H04L 49/205 710/305 |
| 2006/0205483 A1 | 9/2006 | Meyer et al. |
| 2006/0205509 A1* | 9/2006 | Hirota ................... A63F 13/795 463/40 |
| 2006/0205510 A1 | 9/2006 | Lauper |
| 2006/0217198 A1 | 9/2006 | Johnson |
| 2006/0236352 A1 | 10/2006 | Scott, III |
| 2006/0248553 A1 | 11/2006 | Mikkelson et al. |
| 2006/0248564 A1* | 11/2006 | Zinevitch ............... H04N 17/00 725/115 |
| 2006/0256865 A1 | 11/2006 | Westerman |
| 2006/0256868 A1 | 11/2006 | Westerman |
| 2006/0269120 A1 | 11/2006 | Nehmadi et al. |
| 2006/0285586 A1 | 12/2006 | Westerman |
| 2007/0004516 A1 | 1/2007 | Jordan et al. |
| 2007/0013547 A1 | 1/2007 | Boaz |
| 2007/0019826 A1 | 1/2007 | Horbach et al. |
| 2007/0028272 A1 | 2/2007 | Lockton |
| 2007/0037623 A1 | 2/2007 | Romik |
| 2007/0054695 A1 | 3/2007 | Huske et al. |
| 2007/0078009 A1 | 4/2007 | Lockton et al. |
| 2007/0083920 A1 | 4/2007 | Mizoguchi et al. |
| 2007/0086465 A1 | 4/2007 | Paila et al. |
| 2007/0087832 A1 | 4/2007 | Abbott |
| 2007/0093296 A1 | 4/2007 | Asher |
| 2007/0106721 A1 | 5/2007 | Schloter |
| 2007/0107010 A1 | 5/2007 | Jolna et al. |
| 2007/0129144 A1 | 6/2007 | Katz |
| 2007/0147870 A1 | 7/2007 | Nagashima et al. |
| 2007/0162328 A1 | 7/2007 | Reich |
| 2007/0183744 A1 | 8/2007 | Koizumi |
| 2007/0197247 A1 | 8/2007 | Inselberg |
| 2007/0210908 A1 | 9/2007 | Putterman et al. |
| 2007/0219856 A1 | 9/2007 | Ahmad-Taylor |
| 2007/0222652 A1 | 9/2007 | Cattone et al. |
| 2007/0226062 A1 | 9/2007 | Hughes et al. |
| 2007/0238525 A1 | 10/2007 | Suomela |
| 2007/0243936 A1 | 10/2007 | Binenstock et al. |
| 2007/0244570 A1 | 10/2007 | Speiser et al. |
| 2007/0244585 A1 | 10/2007 | Speiser et al. |
| 2007/0244749 A1 | 10/2007 | Speiser et al. |
| 2007/0265089 A1 | 11/2007 | Robarts |
| 2007/0294410 A1* | 12/2007 | Pandya ................ H04L 67/101 709/226 |
| 2008/0005037 A1 | 1/2008 | Hammad |
| 2008/0013927 A1 | 1/2008 | Kelly et al. |
| 2008/0051201 A1 | 2/2008 | Lore |
| 2008/0066129 A1 | 3/2008 | Katcher et al. |
| 2008/0076497 A1 | 3/2008 | Kiskis et al. |
| 2008/0104630 A1 | 5/2008 | Bruce |
| 2008/0146337 A1 | 6/2008 | Halonen |
| 2008/0169605 A1 | 7/2008 | Shuster et al. |
| 2008/0222672 A1 | 9/2008 | Piesing |
| 2008/0240681 A1 | 10/2008 | Fukushima |
| 2008/0248865 A1 | 10/2008 | Tedesco |
| 2008/0270288 A1 | 10/2008 | Butterly et al. |
| 2008/0288600 A1 | 11/2008 | Clark |
| 2009/0011781 A1 | 1/2009 | Merrill et al. |
| 2009/0094632 A1 | 4/2009 | Newman et al. |
| 2009/0103892 A1 | 4/2009 | Hirayama |
| 2009/0186676 A1 | 7/2009 | Amaitis et al. |
| 2009/0163271 A1 | 9/2009 | George et al. |
| 2009/0228351 A1 | 9/2009 | Rijsenbrij |
| 2009/0234674 A1 | 9/2009 | Wurster |
| 2009/0264188 A1 | 10/2009 | Soukup |
| 2009/0271512 A1* | 10/2009 | Jorgensen ............. H04L 69/168 709/224 |
| 2009/0325716 A1 | 12/2009 | Harari |
| 2010/0099421 A1 | 4/2010 | Patel et al. |
| 2010/0099471 A1 | 4/2010 | Feeney et al. |
| 2010/0107194 A1 | 4/2010 | McKissick et al. |
| 2010/0120503 A1 | 5/2010 | Hoffman et al. |
| 2010/0137057 A1 | 6/2010 | Fleming |
| 2010/0203936 A1 | 8/2010 | Levy |
| 2010/0279764 A1 | 11/2010 | Allen et al. |
| 2010/0296511 A1* | 11/2010 | Prodan ................ H04N 21/658 370/389 |
| 2011/0016224 A1* | 1/2011 | Riley ................... H04L 47/762 709/232 |
| 2011/0053681 A1 | 3/2011 | Goldman |
| 2011/0065490 A1 | 3/2011 | Lutnick |
| 2011/0081958 A1 | 4/2011 | Herman |
| 2011/0116461 A1* | 5/2011 | Holt .................... H04L 47/2408 370/329 |
| 2011/0130197 A1 | 6/2011 | Bythar et al. |
| 2011/0227287 A1 | 9/2011 | Reabe |
| 2011/0269548 A1 | 11/2011 | Barclay et al. |
| 2011/0306428 A1 | 12/2011 | Lockton et al. |
| 2012/0058808 A1 | 3/2012 | Lockton |
| 2012/0115585 A1 | 5/2012 | Goldman |
| 2012/0157178 A1 | 6/2012 | Lockton |
| 2012/0264496 A1 | 10/2012 | Behrman et al. |
| 2012/0282995 A1 | 11/2012 | Allen et al. |
| 2012/0295686 A1 | 11/2012 | Lockton |
| 2013/0005453 A1 | 1/2013 | Nguyen et al. |
| 2013/0072271 A1 | 3/2013 | Lockton et al. |
| 2013/0079081 A1 | 3/2013 | Lockton et al. |
| 2013/0079092 A1 | 3/2013 | Lockton et al. |
| 2013/0079093 A1 | 3/2013 | Lockton et al. |
| 2013/0079135 A1 | 3/2013 | Lockton et al. |
| 2013/0079150 A1 | 3/2013 | Lockton et al. |
| 2013/0079151 A1 | 3/2013 | Lockton et al. |
| 2013/0196774 A1 | 8/2013 | Lockton et al. |
| 2013/0225285 A1 | 8/2013 | Lockton |
| 2013/0225299 A1 | 8/2013 | Lockton |
| 2014/0031134 A1 | 1/2014 | Lockton et al. |
| 2014/0100011 A1 | 4/2014 | Gingher |
| 2014/0106832 A1 | 4/2014 | Lockton et al. |
| 2014/0128139 A1 | 5/2014 | Shuster et al. |
| 2014/0155130 A1 | 6/2014 | Lockton et al. |
| 2014/0155134 A1 | 6/2014 | Lockton |
| 2014/0206446 A1 | 7/2014 | Lockton et al. |
| 2014/0237025 A1 | 8/2014 | Huske et al. |
| 2014/0248952 A1 | 9/2014 | Cibula et al. |
| 2014/0256432 A1 | 9/2014 | Lockton et al. |
| 2014/0279439 A1 | 9/2014 | Brown |
| 2014/0287832 A1 | 9/2014 | Lockton et al. |
| 2014/0309001 A1 | 10/2014 | Root |
| 2014/0335961 A1 | 11/2014 | Lockton et al. |

(56) References Cited

U.S. PATENT DOCUMENTS

| | | |
|---|---|---|
| 2014/0335962 A1 | 11/2014 | Lockton et al. |
| 2014/0378212 A1 | 12/2014 | Sims |
| 2015/0011310 A1 | 1/2015 | Lockton et al. |
| 2015/0024814 A1 | 1/2015 | Root |
| 2015/0067732 A1 | 3/2015 | Howe et al. |
| 2015/0148130 A1 | 5/2015 | Cibula et al. |
| 2015/0238839 A1 | 8/2015 | Lockton |
| 2015/0238873 A1 | 8/2015 | Amone et al. |
| 2015/0258452 A1 | 9/2015 | Lockton et al. |
| 2015/0356831 A1* | 12/2015 | Osibodu ............ G07F 17/3272 463/25 |
| 2016/0023116 A1 | 1/2016 | Wire |
| 2016/0045824 A1 | 2/2016 | Lockton et al. |
| 2016/0049049 A1 | 2/2016 | Lockton |
| 2016/0054872 A1 | 2/2016 | Cibula et al. |
| 2016/0082357 A1 | 3/2016 | Lockton |
| 2016/0121208 A1 | 5/2016 | Lockton et al. |
| 2016/0134947 A1 | 5/2016 | Huske et al. |
| 2016/0217653 A1 | 7/2016 | Meyer |
| 2016/0271501 A1 | 9/2016 | Balsbaugh |
| 2016/0361647 A1 | 12/2016 | Lockton et al. |
| 2016/0375362 A1 | 12/2016 | Lockton et al. |
| 2017/0036110 A1 | 2/2017 | Lockton et al. |
| 2017/0036117 A1 | 2/2017 | Lockton et al. |
| 2017/0043259 A1 | 2/2017 | Lockton et al. |
| 2017/0053498 A1 | 2/2017 | Lockton |
| 2017/0065891 A1 | 3/2017 | Lockton et al. |
| 2017/0098348 A1 | 4/2017 | Odom |
| 2017/0103615 A1 | 4/2017 | Theodosopoulos |
| 2017/0128840 A1 | 5/2017 | Croci |
| 2017/0221314 A1 | 8/2017 | Lockton |
| 2017/0225071 A1 | 8/2017 | Lockton et al. |
| 2017/0225072 A1 | 8/2017 | Lockton et al. |
| 2017/0232340 A1 | 8/2017 | Lockton |
| 2017/0243438 A1 | 8/2017 | Merati |
| 2017/0249801 A1 | 8/2017 | Malek |
| 2017/0252649 A1 | 9/2017 | Lockton et al. |
| 2017/0259173 A1 | 9/2017 | Lockton et al. |
| 2017/0264961 A1 | 9/2017 | Lockton |
| 2017/0282067 A1 | 10/2017 | Lockton et al. |
| 2017/0296916 A1 | 10/2017 | Lockton et al. |
| 2017/0304726 A1 | 10/2017 | Lockton et al. |
| 2017/0345260 A1 | 11/2017 | Strause |
| 2018/0025586 A1 | 1/2018 | Lockton |
| 2018/0071637 A1 | 3/2018 | Baazov |
| 2018/0104582 A1 | 4/2018 | Lockton et al. |
| 2018/0104596 A1 | 4/2018 | Lockton et al. |
| 2018/0117464 A1 | 5/2018 | Lockton et al. |
| 2018/0140955 A1 | 5/2018 | Lockton et al. |
| 2018/0154255 A1 | 6/2018 | Lockton |
| 2018/0169523 A1 | 6/2018 | Lockton et al. |
| 2018/0190077 A1 | 7/2018 | Hall |
| 2018/0236359 A1 | 8/2018 | Lockton et al. |
| 2018/0243652 A1 | 8/2018 | Lockton et al. |
| 2018/0264360 A1 | 9/2018 | Lockton et al. |
| 2018/0300988 A1 | 10/2018 | Lockton |
| 2018/0318710 A1 | 11/2018 | Lockton et al. |
| 2019/0054375 A1 | 2/2019 | Lockton et al. |
| 2019/0060750 A1 | 2/2019 | Lockton et al. |
| 2019/0143225 A1 | 5/2019 | Baazov |

FOREIGN PATENT DOCUMENTS

| | | |
|---|---|---|
| CA | 2279069 | 7/1999 |
| CA | 2287617 | 10/1999 |
| EP | 0649102 A3 | 6/1996 |
| GB | 2364485 | 1/2002 |
| JP | 11-46356 | 2/1999 |
| JP | 11-239183 | 8/1999 |
| JP | 2000-165840 | 6/2000 |
| JP | 2000-217094 | 8/2000 |
| JP | 2000-358255 | 12/2000 |
| JP | 2001-28743 | 1/2001 |
| JP | 2000-209563 | 7/2008 |
| NZ | 330242 | 10/1989 |
| WO | 01/039506 A2 | 5/2001 |
| WO | 01/65743 A1 | 9/2001 |
| WO | 02/03698 A1 | 10/2002 |
| WO | 2005064506 A1 | 7/2005 |
| WO | 2006004855 | 1/2006 |
| WO | 2006004856 | 1/2006 |
| WO | 2007002284 | 1/2007 |
| WO | 2007016575 | 2/2007 |
| WO | 2007041667 | 4/2007 |
| WO | 2008027811 A2 | 3/2008 |
| WO | 2008115858 A1 | 9/2008 |

OTHER PUBLICATIONS

Gambling Commission, "Virtual currencies, eSports and social casino gaming-position paper," Mar. 2017, Retrieved on Jan. 22, 2020, http://gamblingcomission.gov.uk/PDF/Virtual-currencies-eSports-and -social-casino-gaming.pdf.

Sipko et al., "Machine learning for the prediction of professional tennis matches," In: MEng computing-final year project, Imperial College London, Jun. 15, 2015, http://www.doc.ic.ac.uk/teaching/distinguished-projects/2015/m.sipko.pdf.

WinView Game Producer, "Live TV Sports Play Along App WinView Games Announces Sponsorship With PepsiCo To Start This Holiday Season," In Winview Games. Dec. 21, 2016, Retrieved on Jan. 21, 2020 from , http://www. winviewgames./press-release/live-tv-sports-play-along-app-winview-games-announces-sponsorship-pepsico-start-holiday-season/.

International Search Report and The Written Opinion for the PCT/US2019/054859 dated Feb. 4, 2020.

International Preliminary Report dated Apr. 22, 2021 for the application PCT/US2019/054859.

Two Way TV Patent and Filing Map www.twowaytv.com/version4/technologies/tech_patents.asp.

Ark 4.0 Standard Edition, Technical Overview www.twowaytv.com/version4/technologies/tech_ark_professionals.asp.

"Understanding the Interactivity Between Television and Mobile commerce", Robert Davis and David Yung, Communications of the ACM, Jul. 2005, vol. 48, No. 7, pp. 103-105.

"Re: Multicast Based Voting System" www.ripe.net/ripe/maillists/archives/mbone-eu-op/1997/msg00100html.

"IST and Sportal.com: Live on the Internet Sep. 14, 2004 by Clare Spoonheim", www.isk.co.usk/NEWS/dotcom/ist_sportal.html.

"Modeling User Behavior in Networked Games byTristan Henderson and Saleem Bhatti", www.woodworm.cs.uml.edu/rprice/ep/henderson.

"SMS Based Voting and Survey System for Meetings", www.abbit.be/technology/SMSSURVEY.html.

"PurpleAce Launches 3GSM Ringtone Competition", www.wirelessdevnet.com/news/2005/jan/31/news6html.

"On the Perfomance of Protocols for collecting Responses over a Multiple-Access Channel", Mostafa H. Ammar and George N. Rouskas, IEEE INCOMFORM '91, pp. 1490-1499, vol. 3, IEEE, New York, NY.

Merriam-Webster, "Game" definition, <http://www.merriam-webster.com/dictionary/agme.pg.1.

Ducheneaut et al., "The Social Side of Gaming: A Study of Interaction Patterns in a Massively Multiplayer Online Game", Palo Alto Research Center, Nov. 2004, vol. 6, Issue 4, pp. 360-369.

http://help.yahoo.com/help/us/tourn/tourn-03.html.

Fantasy sport-Wikipedia.pdf, https://en.wikepedia.org/w/index.php?title=Fantasy_sport&oldid=685260969(Year:2015).

* cited by examiner

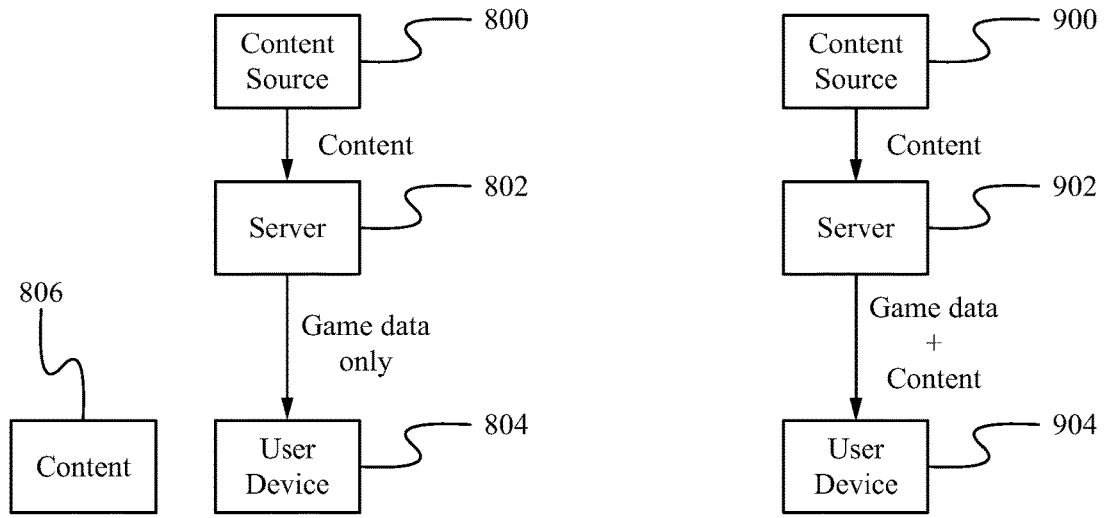
Fig. 8          Fig. 9
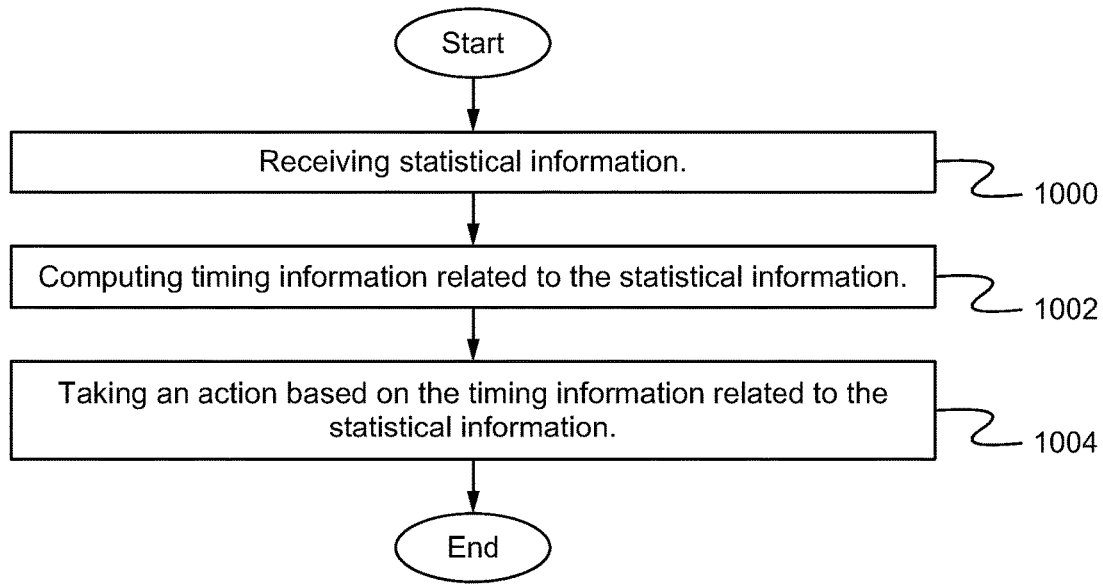
Fig. 10

SYNCHRONIZED GAMING AND PROGRAMMING

RELATED APPLICATION(S)

This Patent Application is a continuation of U.S. patent application Ser. No. 15/608,616, filed May 30, 2017, titled "SYNCHRONIZED GAMING AND PROGRAMMING," which is a continuation-in-part of U.S. patent application Ser. No. 15/586,198, filed May 3, 2017, titled "SYNCHRONIZED GAMING AND PROGRAMMING," which is a continuation-in-part of U.S. patent application Ser. No. 14/172,539, filed Feb. 4, 2014, titled "SYNCHRONIZED GAMING AND PROGRAMMING," which is a divisional of U.S. patent application Ser. No. 13/484,129, filed May 30, 2012, titled "SYNCHRONIZED GAMING AND PROGRAMMING," which is a continuation-in-part of U.S. patent application Ser. No. 13/403,845, filed Feb. 23, 2012, titled, "A METHODOLOGY FOR EQUALIZING SYSTEMIC LATENCIES IN TELEVISION RECEPTION IN CONNECTION WITH GAMES OF SKILL PLAYED IN CONNECTION WITH LIVE TELEVISION PROGRAMMING" which is a continuation of co-pending of U.S. patent application Ser. No. 11/786,992, filed Apr. 12, 2007, titled, "A METHODOLOGY FOR EQUALIZING SYSTEMIC LATENCIES IN TELEVISION RECEPTION IN CONNECTION WITH GAMES OF SKILL PLAYED IN CONNECTION WITH LIVE TELEVISION PROGRAMMING," which claims priority under 35 U.S.C. § 119(e) of the co-owned U.S. Provisional Patent Application No. 60/791,793, filed Apr. 12, 2006, and titled "A METHODOLOGY FOR EQUALIZING SYSTEMIC LATENCIES IN TELEVISION RECEPTION IN CONNECTION WITH GAMES OF SKILL PLAYED IN CONNECTION WITH LIVE TELEVISION PROGRAMMING" which are also all hereby incorporated by reference in their entireties.

FIELD OF THE INVENTION

The present invention relates to the field of distributed gaming. More specifically, the present invention relates to the field of distributed gaming utilizing a mobile device.

BACKGROUND OF THE INVENTION

In the United States alone there are over 230 million registered cellular phones. With the expiration of the U.S. Pat. No. 4,592,546 to Fascenda and Lockton, companies are able to now use the cellular phone and other mobile communication devices utilizing a multicast network to control television viewers in games of skill based upon predicting, for example, what the quarterback may call on the next play within a football game. Both prime time and programs syndicated on a market-by-market basis lend themselves to games of skill. In addition, games of skill with a common start time can be conducted simultaneously among cellular phone owners, based on classic card, dice, trivia, and other games. In order to avoid the anti-gaming laws in the various states, the winners must be determined by the relative skill, experience and practice of the player in each discrete game.

U.S. Pat. No. 5,813,913 ('913) to Berner and Lockton provides for a central computing system which includes a means of grouping participants having similar skill levels together in simultaneous, but separate, levels of competition playing an identical game. The relative performances are communicated to only those participants competing at the same skill level. The '913 patent also provides for a wireless receiving device to permanently store the specific skill level for each participant for each type of common event such as those based on televised sports or game shows. The '913 patent provides for a telephonic link at the completion of the game to collect information and update the skill level of the participants of a particular game. When a person achieves sufficient points or meets other objective criteria to graduate into another skill level, a method is provided for accomplishing this in the central computer and then transmitting an alert to the participant notifying them of their promotion. The '913 patent describes awarding prizes and providing recognition for the members of each discreet skill level in a common game. All users, no matter what level they are on, receive the same number of questions and thus the possibility of earning the same number of points. Thus direct comparisons between users at different levels, although not encouraged are possible. Such comparisons between players of disparate skills can lead to user discouragement.

Games of skill and chance have an intrinsic excitement and entertainment value. Any game is greatly enhanced by a participant's ability to know how their performance compares in relation to other participants and/or to historical performance for the game throughout the contest. As with any game of skill, competition among friends, or with strangers of similar experience, or the ability at ones option, sometimes for an extra consideration, to compete in a separate team or individual contest, offers the opportunity of increased enjoyment and prizes.

Games of skill that rely on participation by watching an event on a television have potential latency issues since television signal reception is not synchronized nationwide. For example, a participant in Texas using a satellite dish network may experience a 3 second delay compared to an individual in California using a cable network. Live streams via the Internet of events utilizing a TV set or other display offer an alternative method of viewing televised events. The signal compression process creates systemic propagation delays that are often significant. Also, there are delays between individuals attending a game live and those watching the game live on television. Furthermore, for taped programs, both those shown to viewers in time zones or those syndicated on a market-by-market basis, there are potential delay issues as experienced with the live broadcasts in addition to other possible differences in timing of the broadcasts. Therefore, to maintain user enjoyment and fairness for all participants, these delays must be neutralized.

SUMMARY OF THE INVENTION

To encourage viewer participation, games, contests and social interactions are able to be synchronized with programming such as television shows or commercials utilizing a second screen such as a cell phone, iPad® or laptop computer. The programming is able to be television programming, Internet programming (e.g. a video displayed on a webpage or mobile device) or any other programming. The gaming is able to be any game such as a game of skill or chance, for example, betting on the outcome of a soccer penalty kick, where legal.

BRIEF DESCRIPTION OF THE DRAWINGS

FIG. 8 illustrates a system for implementing a game synchronized with programming according to some embodiments.

FIG. 9 illustrates a system for implementing a game synchronized with programming according to some embodiments.

FIG. 10 illustrates a flowchart of a method of utilizing statistical information with a game of skill or chance according to some embodiments.

DETAILED DESCRIPTION OF THE PREFERRED EMBODIMENT

Figure 1:
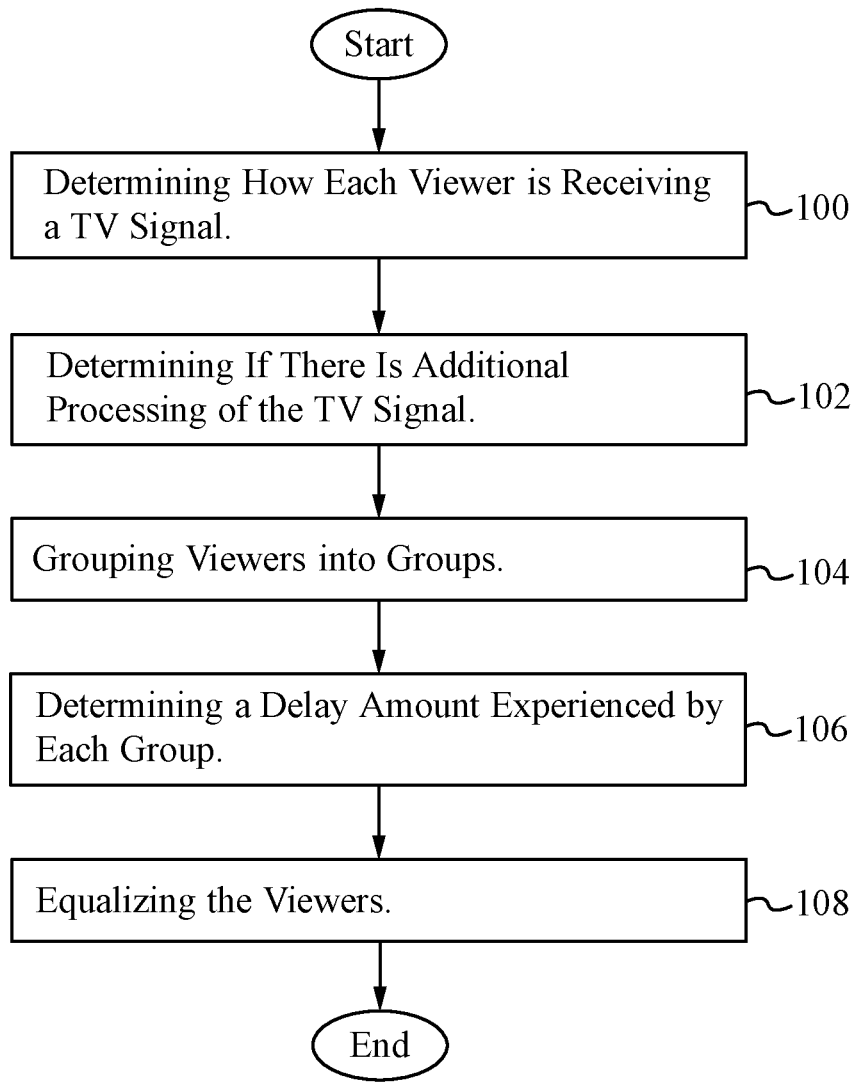
FIG. 1 illustrates a flowchart of a process of preventing latency issues from giving an advantage to some participants.

U.S. Provisional Patent Application No. 60/692,356, filed Jun. 20, 2005, and entitled "SYSTEMS AND METHODOLOGIES ENABLING A CELL PHONE BASED SUBSCRIPTION SERVICE OFFERING A VARIETY OF SCHEDULED GAMES IN CONNECTION WITH LIVE TELEVISION PROGRAMMING," is incorporated by reference herein.

Three separate classes of latency issues for the length of time it takes a television signal to reach a viewer in producing real-time entertainment such as games of skill synchronized with television programming are addressed. The latency issues are: 1) systemic propagation delays in the delivery of a television signal to a receiver, 2) arbitrarily imposed delays on a broadcast television signal and 3) variances in precise broadcast times of segments of taped television programs between local and national commercials, sold through syndication to individual television stations.

Systemic Propagation Delays

There are specific challenges facing a service comprised of games or other entertainment played by remote participants utilizing cellular phones or the Internet, in connection with a live or taped telecast. Examples are live baseball, basketball and football games, taped game shows such as Wheel of Fortune™ and Jeopardy™ or other television programming such as predicting the winners of the Oscars. In a game of skill, for example, fair competition necessitates that a fast paced game, based on the unfolding television action has a level playing field for all participants regardless of how they receive their television signal. Propagation delays result from, among other things, the number of satellite hops required to deliver the signal, the method of processing and rebroadcasting the signal after it is received by cable systems head ends or an over the air broadcast television station, and whether or not the signal is further processed for high definition television. Furthermore, digital television recording systems (DVRs) such as TiVo™ are also able to generate delays in the viewing of the picture after receipt via satellite or cable. These delays are able to result in a difference between the first signal received and the last received of more than several seconds.

People have an unsatisfactory experience and/or others are able to gain a potential competitive advantage from the variances in the exact time one viewer sees an event on their television versus another competitor who receives their television signal through a different delivery path. This is a challenge faced in Europe where over 65 million TV viewers participate in "In Game" wagering on televised sporting events. In the U.S., the 120 million television homes receive their signal either through an over the air broadcast, cable system or via satellite delivery. Each delivery system can impose propagation delays of various time lengths. If the delay between the time a viewer with the least amount of delay and the person receiving the signal with the greatest amount of delay exceeds several seconds, some inequalities in game experience and play are able to result.

One example is a game of skill based upon a football telecast, wherein competitors predict the play that the coaches and/or quarterback call prior to the snap of the ball. The competitor's prediction is based among other things on their observation of the down, distance and the offensive and defensive formations on the field and tendencies of the teams in these situations. Such a game utilizes a "lock out" signal, as described in the U.S. Pat. No. 4,592,546 to Fascenda, entitled "Game of Skill Playable by Remote Participants in Conjunction with a Live Event," which is incorporated by reference herein, to prohibit the entry of predictions after the competitor sees the play begin to unfold, at the snap of the ball. The time stamped "lock out" signal is generated by a game producer also viewing the same telecast from a different location. If the game producer is viewing a television signal several seconds before some competitors and generating a time stamp based on that event, an advantage is able to result if the difference in the time stamp and the receipt of the "lock out" signal is more than several seconds earlier in relation to another competitor's television signal which is delayed. During this period of time, for example, on a first or second down situation, a competitor receives the "lock out" just as the quarterback receives the snap and the corresponding television signal at the same time as the game producer while another competitor with a delayed television signal, receives a "lock out" signal while the quarterback is approaching the line of scrimmage. In another example, if the game producer is viewing a signal after a viewer, a competitor might see the quarterback start to drop back into a "shot gun" formation, making the likelihood of a pass considerably higher. This latter player might have time to change his prediction from, "run" to "pass" before receiving a "lock out" generated at the snap of the ball. A person consistently receiving a "lock out" later than another competitor might, through the course of the game, gain some competitive advantage.

While it is not clear that sufficient enough competitive advantage is gained between a competitor receiving his "lock out" signal precisely at the snap of the ball and one who is locked out a few seconds prior to the snap of the ball, this discrepancy could present the appearance of a playing field that is not level, and one of the primary benefits of the system addressed herein is to ensure the competitors feel they are on equal footing.

The above described issue is solved through a system and method to effectively equalize systemic propagation delay variances to a required level dictated by the demands and rules of a particular game, so that a material competitive advantage is not obtained and the user experience is optimized for all players.

The solution first relies on the determination of how each viewer is receiving their television signal (e.g. via an over the air broadcast in a metropolitan area, via a particular cable system, a particular satellite system, or through an Internet delivered live stream). All subscribers to a particular service provider or who are receiving an over the air broadcast in a specific metropolitan area will receive the signal at their location at the same time. It is also able to be determined if there is further processing of the signal within the homes, office, bar and others, which could further increase the total length of the propagation delay. Examples would be the use of a DVR, such as TiVo™. A variety of methodologies are able to be utilized to determine the time difference between the reception of the television picture being utilized by the central game production facility where "lock out" signals are generated and each separate group of viewers around the country or around the world.

For this system, the total viewing population for a telecast is divided into segments or blocks of viewers referred to as "cohorts." For example, the 2 million inhabitants of the San Francisco Bay Area would be divided into approximately 1 over the air broadcast, 3 satellite independent providers and several cable "head ends" or central broadcast points serving a "cohort." This information would be gathered at a central game server, and all players registered to play in a particular contest would be assigned to a specific cohort of viewers.

The following are some methodologies for determining the delays experienced by various cohorts who are able to be used in combination or separately.

In one methodology, upon joining the service and prior to initial game play, subscribers and competitors are required to identify the method by which they receive their television signal and identify the cable or satellite service provider and answer questions relative to whether or not they subscribe to an analog or digital high definition service or utilize a DVR. This information is able to be verified by sending questions to their cellular phones concerning commercials, station breaks and the precise time they are viewed or utilizing other information only seen by members of that cohort.

In another methodology, a routine is established upon entry into the game where the individual viewer is asked to mark the precise time a predetermined audio or visual event in the television program occurs, such as the initial kickoff, which would establish the deviation of their receipt of their television picture from the television signal utilized by the game producers. While some viewers might attempt to cheat by delaying their input, the earliest entries from the cohorts in this group would be averaged to establish the accurate delta between the receipt of the telecast by the production crew and those in each discrete sub group of viewers.

In another methodology, the GPS function in the cellular phone is used to determine the physical location of a viewer which is matched to a database of cable lead ends or over the air broadcast stations available to a consumer in that precise location.

In another methodology, employees of the game producer who are members of the subgroups which constitute the competitors/viewers, e.g. a subscriber to Comcast Cable in San Francisco, are utilized by the game service provider. These individuals would provide the current propagation delay information sent to the game server utilizing their identification of a recognizable event they observe on their television set, such as the initial snap of the ball.

In another methodology, an event is streamed via an Internet connection, where a game control system measures the compression caused delay in signal delivery for separate sources and appropriately adjusts the game control data to individually synchronize with the separate sources of the televised event.

In another methodology, audio or video artifacts or information done in cooperation with the television signal provider are inserted which must be immediately responded to by the competitor to verify the source of their television signal or monitored at cooperative viewers' television sets.

In another methodology, the various delays through an automated system linked to the game server, which continuously samples the audio or video track of the underlying satellite, cable or over the air broadcast television signals are established around the country to provide the information of the precise arrival of the underlying television picture.

Utilizing software resident in the game control server, game control data for each set of viewers/competitors of the game in progress who are receiving their television picture through the same source are batched together by the game control server, and the appropriate delay is either time stamped on the game "lock out" signals, or is imposed on the entire data stream so that competitors receiving their television information slightly behind or ahead of others gain no material competitive advantage. Another method is for the game control server to send all the game control data to all of the viewers/competitors of the game at the same time, and the client software is able to delay the presentation of the game data based on the viewers' cohort.

Utilizing these methodologies to measure the delays in each cohort, each cohort of viewers would have artificial time delays on the game control information imposed by the game control server, which would substantially equalize the receipt of "lock out" data relative to the event triggering the "lock out," based on the underlying television programming, for example, the snap of the football. Players receiving the television signals in advance of the one with the slowest receipt of the television signal would receive "lock out" signals slightly delayed or time stamped with a slightly later time as described in U.S. Pat. No. 4,592,546. By providing a correspondingly delayed lock out to a viewer receiving their signal later, a potential advantage is mitigated.

Alternatively, this time equalization from cohort to cohort could, for example, involve artificially delaying the transmission of the game control data stream sent to all competitors cell phones or other mobile devices by the appropriate amount of seconds, to sufficiently minimize the advantage a player with a few more seconds of television based information would have. For example, by time stamping the "lock out" signal at an earlier event, such as when the team breaks from the huddle, the chance of some cohorts seeing the actual beginning of the play is eliminated and the discrepancy in propagation delay provides little or no advantage.

FIG. 1 illustrates a flowchart of a process of preventing latency issues from giving an advantage to some participants. In the step 100, it is determined how each viewer receives a television signal, where possibilities include an over the air broadcast, a particular cable system or a particular satellite system. In the step 102, it is determined if there is additional processing of the television signal when after the signal enters a viewer/participant's house, office, bar or other location from an item such as a DVR. In the step 104, the viewers/participants are grouped into groups also referred to as cohorts. In the step 106, a delay amount is determined for each group. The delay amount is able to be determined by the one or more methods as described above. In the step 108, the viewers/participants are equalized. The methods of equalization vary, but some examples include time stamping on the game "lock out" signals, imposing a time stamp on the entire data stream so that competitors receiving their television information are slightly behind or ahead of others gain no material competitive advantage. Another method is for the game control server to send all the game control data to all of the viewers/participants of the game at the same time, and the client software is able to delay the presentation of the game data based on the viewers' group.

Arbitrarily Imposed Delays on the Broadcast of the Signal and the Physically Present Competitor As a result of the Janet Jackson half time show episode at the 2004 Super Bowl, some networks have announced their intentions to impose up to a 7 second delay on telecasts of live sporting events. More recently an obscenity uttered by a competitor at the conclusion of a live NASCAR race has resulted in another network announcing it may impose a 5-7 second delay on future broadcasts of NASCAR races. These arbitrarily imposed delays are a significantly longer duration than those resulting from the above described propagation delays of the broadcast television or cellular network control information.

A distinct advantage is able to arise for a game player who is physically present at an event being televised which is the basis of a contest of skill in the home, or other location, separate from the live game venue. This is because in certain instances they will receive "lock out" signals generated for competitors among the television viewing audience, particularly if the game producer is not physically present at the venue, but producing by viewing a telecast. This discrepancy would permit prediction entry as much as 7 seconds later than those watching an artificially delayed television picture. This magnitude of delay can result in a significant competitive advantage for the game player who is physically present. For example, a soccer or hockey contest of skill might contain an element where a competitor is given a limited number of opportunities to predict if there will be a "shot on goal" within the next 5 seconds. The 5 second advantage to the competitor physically present would be significant, because the receipt of a lockout signal generated for the huge television audience could occur after a shot had occurred.

In a contest based on a football game, a competitor present at the stadium would receive their "lock out" signals after the play was underway and could often determine whether the play was a pass or a run prior to receipt of the lockout signal. It is also likely that other live televised events such as The Oscars, Grammy's, beauty contests and other television programming that can support games of skill would impose delays on the telecast for the same or different reasons, also providing the opportunity for a competitive advantage for those who are attending the event in person.

The cellular telephone system currently has methodologies to determine a user's physical location. The 911 emergency laws mandate the cellular systems to have the capability of determining the location of a 911 emergency caller within 150 feet. More sophisticated approaches combine cellular site location technology with geosynchronous positioning satellite capabilities. Companies like Qualcomm™ have implemented various location technologies such as Snaptrack, SnapSmart and Snapcore, which provide a cellular phone's physical location within a matter of yards.

For each televised live event, the physical venue for this event would be known by the organizer of a game of skill in advance. Therefore, it is possible to determine for each contest of skill the specific cellular sites which will serve cellular phone owners physically present at that venue. A methodology is employed to identify all of the cellular phones logging into the game server registering to play the game of skill which are co-located within cellular sites servicing the stadium or auditorium where the televised live event is taking place. A communication methodology between the cellular carrier and the game control computer software contained in the game application resident on a game competitor's phone is able to be used, which would identify the cellular phone physically in the stadium.

Before the start of the contest of skill, the system informs the central computer of the game selected to be played by each competitor, for example, the San Francisco 49ers versus the New York Giants. The central game control server's software would hold current information on the physical location of the stadium of each game, for example, Candlestick Park in South San Francisco, and the cellular sites covering this location. The software resident on the cellular phone or on the server then identifies the phone as one located physically at the telecast game's venue.

To ensure that potential competitors at the live venue are able to also compete in a contest of skill, the central game server will separate the scoring data and game control data for competitors using these cellular phones in this specific location from the general pool of competitors who are not so located, but watching the game via television. A separate contest is then generated and scored for those competitors who have the advantage of viewing the event live, and a separate prize pool is awarded. This separate game would be produced though the observation of the actual game physically at the venue or through the operation of a non-delayed satellite feed.

If it is ultimately determined that certain groups of television viewers, as opposed to live event attendees, who are competitors in these games of skill are gaining sufficient enough competitive advantage, segregating those players at the extreme ends of the propagation delays, into two or more separate contests with separate sets of prizes, may also be employed as described above. For example, separate contests for satellite viewers versus cable and over the air viewers are able to be generated.

Figure 2:
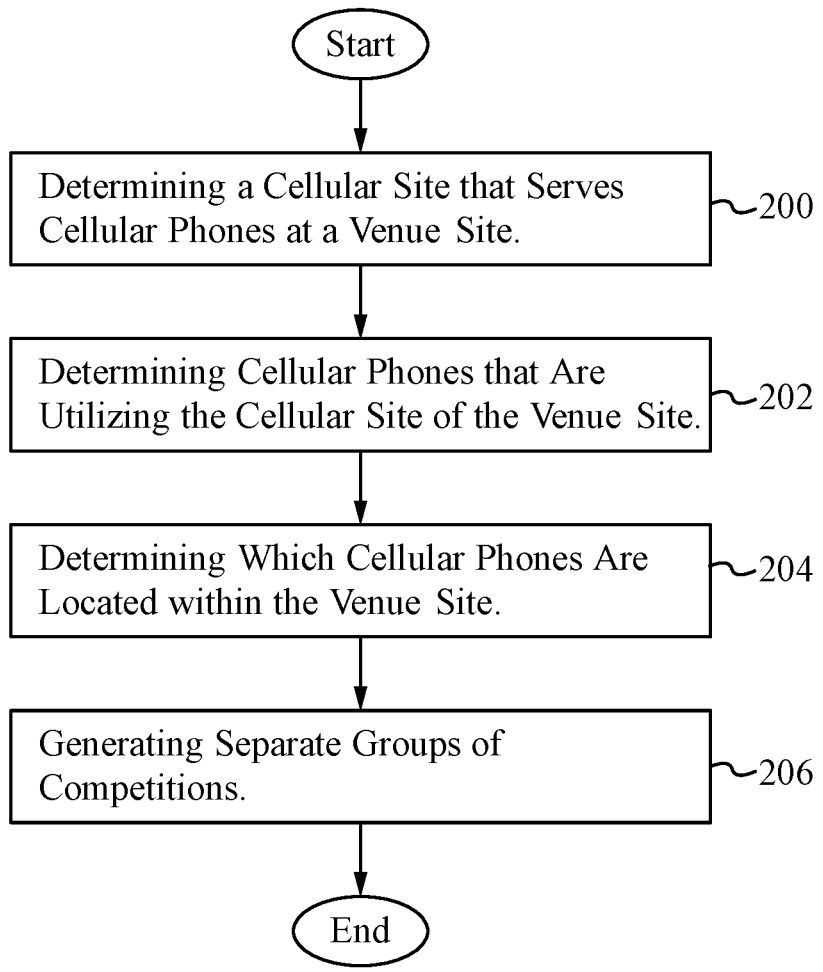
FIG. 2 illustrates a flowchart of a process of preventing participants at a live event from having an unfair advantage over participants watching on television.

FIG. 2 illustrates a flowchart of a process of preventing participants at a live event from having an unfair advantage over participants watching on television. In the step 200, a cellular site that serves cellular phones at a venue site is determined for each contest of skill. For example, if a game of skill is played for a game between the San Francisco 49ers and the Oakland Raiders at Candlestick Park in South San Francisco, a specific cellular site serves the cellular phones in that location. In the step 202, the cellular phones that are utilizing the cellular site of the venue site and are participating in the game of skill for that event are determined. For example, if there are 1,000 cellular phone users in Candlestick Park who register to play in a game of skill involving the 49ers and the Raiders, they are detected by the system. In the step 204, it is determined if the cellular phone is located within the venue site. The determination is made by comparing the current cellular information with information stored on a server indicating the location of each venue such as Candlestick Park. Based on the determination in the step 204, separate groups are generated in the step 206. A group is generated for users that are located at the live venue, and a group is generated for those players that are watching live on television. Therefore, the live players who do not experience any delay compete against each other, and television viewers compete with others television viewers who have a delay.

In addition to implementing the above-mentioned solutions to latency issues, additional groups are able to be generated if the delays between signal providers are not resolved. For example, all viewers with satellite television signals compete against each other, and all cable television viewers compete against each other, with no cross competition.

Taped and Syndicated Television Programs

A separate but related latency problem arises in the case of syndicated television shows, which are by necessity pre-taped. Examples are game shows like Wheel of Fortune™ and Jeopardy™. These pre-recorded television game shows are generally syndicated, meaning they are sold to a specific television station on an exclusive lease for the local television market served by the station's signal. The television stations generally air these half hour episodes at various times in "prime time access," which is generally considered between 6-8 pm. Therefore, with 3 different time zones in the United States, the start times will differ from market to market. In addition, the precise time each commercial bracketed television show segment that is broadcast is able to vary by a few seconds based on the time each station's engineering personnel starts the show's segments after the insertion of local and national commercials. Thus, for a show like Jeopardy™, there might be over 100 separate slightly different broadcasts from a time standpoint for a single episode of Jeopardy™ on a given day. In addition, these syndicated telecasts can also experience the same propagation delays as described above.

Contests of skill on cellular phones around these syndicated telecasts are produced with the cooperation of the game show producers, and game data files are produced which are precisely time-synchronized to the final video tape of the television game show. These files must be precisely synchronized and a delay of just a few seconds could give an unfair competitive advantage to a viewer who is receiving their "lock out" signal later than another competitor in a fast paced game like Jeopardy™. The game data files must be synchronized with the television show at the beginning of the program and again as the show returns to the game competition from each commercial break.

This solution addresses the separate, but related problems of synchronizing game data files with the broadcast of prerecorded and syndicated games, entertainment, reality or other television programming that is aired in different time zones at the choice of the purchasing television station. As opposed to live sporting events, the game production for this genre of programming is not done live through real-time observation of the unfolding telecast but is produced in advance with the cooperation of the show producer as a time synchronized file utilizing the final edited for broadcast, television program.

In general, the game data files are divided into separate "segments" which comprise the entire television program and aired between the insertion of national, regional and local advertising. As the television program returns from the opening commercials, the initial game or entertainment segment is launched by the game producer, synchronized to the playing of the television tape, and the data files for this segment would end with the first commercial break. The other game "chapters" are resynchronized as each segment of the telecast resumes from commercial break. The local telecasts might have variations of anywhere from 1 to 5 seconds, or more, resulting from the use of different commercials by different stations, and the variances in the local production by the engineering management of the syndicated telecasts.

A system first determines all of the separate and unique television markets where the cellular phone service will be offered in connection with a syndicated, taped version of an underlying television program, for example, Jeopardy™. Network broadcasts usually air in three separate time zones. This information is available from the shows syndicator, for example, Jeopardy™, the syndicator King World™ or Sony™, the show's licensor. This information is also publicly available through the various television guides. The game production servers hold the pre-produced game data files to be broadcast to the cellular phones of the participating subscribers, containing, for example, the correct answers and possibly some intentionally wrong multiple choice answers in the case of Jeopardy™ or other multiple choice based game shows. The server begins the broadcast of its time synchronized files for each discrete telecast of a single television program at a precise start point for each "segment" or chapter. With knowledge of the precise timing of the discrete segments of the broadcast, for each separate syndicated market, the server transmits the pre-recorded files in most cases, at a slightly separate and different time to each viewer who is viewing the telecast in a particular market via a particular broadcast, satellite or cable signal.

The precise start times of the beginning episode of a game show and the start times of the other segments, beginning as the show resumes after a national and local commercial are delivered to the server through various methodologies.

One methodology requires the cooperation of an employee of the game provider based on visual observation of the telecast for that market, or being physically present at the event venue, utilizing a personal computer and the Internet, or by utilizing their local cellular phone, all coupled to the game server.

Another methodology includes utilizing an audio or video recognition system with online access to the broadcast of the underlying television program for each separate market which provides real-time tracking of the television broadcast to the game control server, ensuring the game data file is able to be precisely synchronized to the television picture. Information is also able to be inserted in a Vertical Banking Interval (VBI) of the taped syndicated show and tracked online in real time by the game control server. For remote telecasts and online connection from a remote device, reading data embedded in the VBI via a high speed connection to the central game server is utilized. Utilizing some of the procedures outlined above, the propagation delays in the receipt of the cellular transmissions are also monitored and the game server adjusts the data files containing the "lock outs" to accommodate the systemic delay in the delivery of the game data on the cellular networks.

Another methodology, with the cooperation of the producers of game shows, precise audio or video events in the telecast could either be added to the video, such as a visible count down, or existing events in the telecast identified by the producers as synchronization points which the competitors could utilize as start points for the previously downloaded data files at the press of an appropriate button on their cellular phone. This would trigger the launch of a program previously downloaded to the phone's RAM. Then, time synchronization would be launched.

One more methodology uses an audio signal, possibly sub-audible to humans, which is inserted into the taped audio track recognizable by the audio receiver in a cellular phone which would be utilized to start and/or continually keep the pre-produced data files resident on the cellular phone in synchronization with the telecast.

Figure 3:
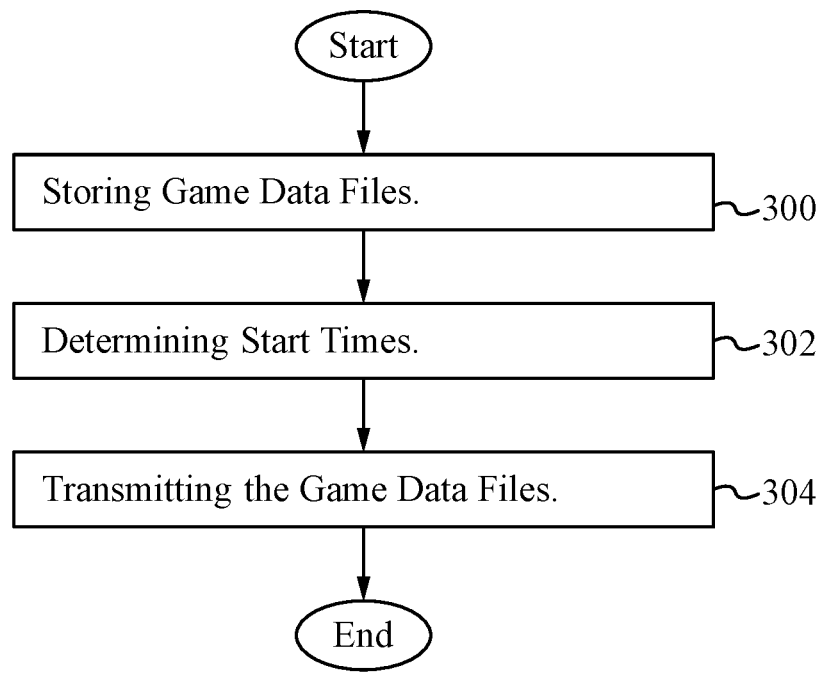
FIG. 3 illustrates a flowchart of a process of handling latency issues for taped programs.

FIG. 3 illustrates a flowchart of a process of handling latency issues for taped programs. In the step 300, pre-produced game data files are stored in servers; preferably, game production servers. The game data files include information required to participate in a game such as questions and answers for a trivia game like Jeopardy™. In the step 302, start times are determined for each discrete telecast of a show. The start times are determined as described above, such as with the cooperation of a game provider employee, utilizing an audio/video recognition system, using a visible count down or a recognizable signal which is able to be recognized by a cellular phone. Other ways of determining start times are possible as well. In the step 304, the game data files are transmitted at appropriate times based on the start times for each separate market. Furthermore, if additional delays are recognized, such as those delays described above, that is able to be accounted for.

Figure 4:
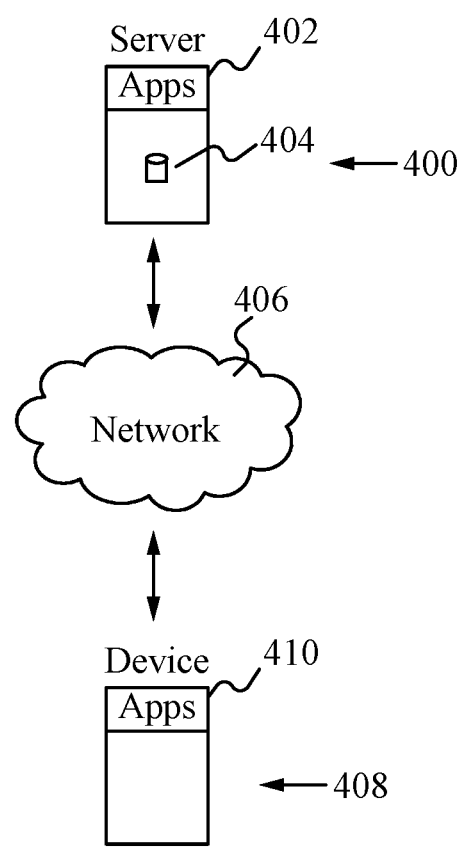
FIG. 4 illustrates a graphical representation of an embodiment of the present invention.

FIG. 4 illustrates a graphical representation of an embodiment of the present invention. A server 400 contains applications 402 and a storage mechanism 404. The applications 402 include an application to generate and modify game control data. The game control data is eventually transferred to users' cellular phones. If necessary the game control data is synchronized and time-stamped for each group, so that, as described previously, there are no unfair advantages for the competitors. A location application stored on the server 400 is able to determine which cellular phones are logged into the server 400 and what their location is. A grouping application is able to separate information such as scoring data and game control data into different groups. The grouping application also separates the cellular phones into groups or cohorts as described above. The storage mechanism 404 is utilized for storing the applications 402 in addition to selections and results. The storage mechanism 404 preferably includes a database for organizing the data including the selections, results, standings and groups amongst other data needed for executing the competitions. The server 400 is part of a network 406. A device 408 couples to the server 400 through the network 406. In some embodiments the network 406 includes the Internet. In some embodiments, the network 406 includes a cellular network. Also, in some embodiments, the network 406 includes both the Internet and a cellular network. The device 408 is preferably a cellular phone. In other embodiments a PDA, a computer, a laptop or any other device capable of communicating with the server 400 is possible. The device 408 stores a variety of applications 410. A game application is stored on the device 408. In some embodiments, software to identify the physical location of the device 408 is stored on the device 408. The device 408 also receives the game control data which ensures no competitors have an unfair advantage using the methodologies described above. Furthermore, the device 408 receives game data which is used to play the games. An example of game data includes Jeopardy™ multiple choice answers. Additional applications are able to be included on the server 400 and on the device 408, as necessary, for smooth operation of the games. Although some of the applications are described separately above, in some embodiments, the applications are included in one large application.

Figure 5:
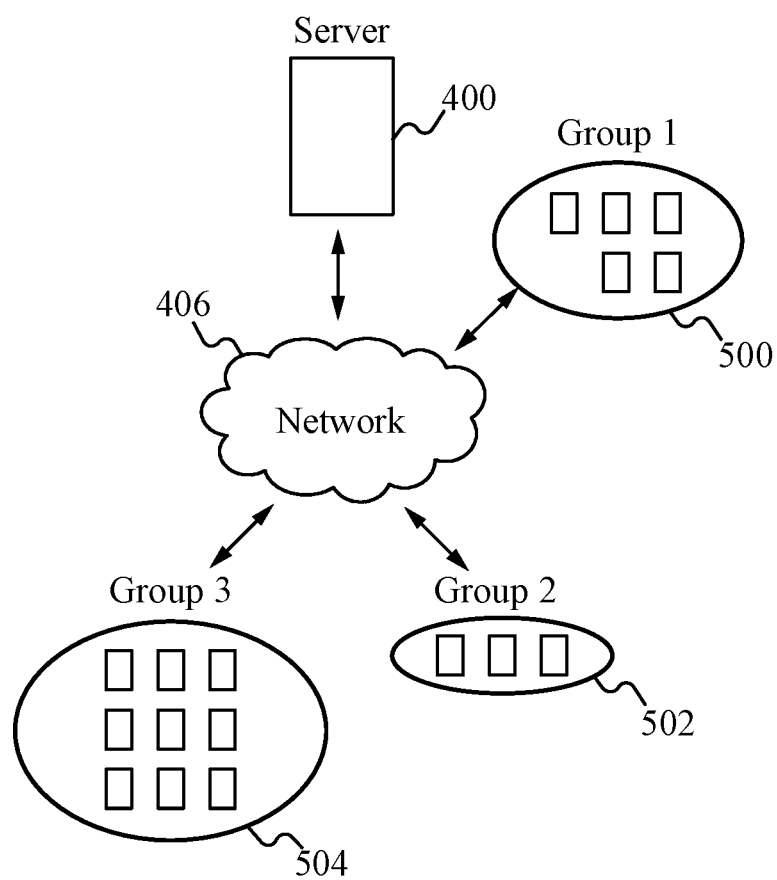
FIG. 5 illustrates a graphical representation of a network of devices of the present invention.

FIG. 5 illustrates a graphical representation of a network of devices of the present invention. A server 400 is coupled to many devices through a network 406. The devices are grouped into groups or cohorts as described above. For example, Group 1 of devices 500 includes a set of devices that receive a television signal through cable with a delay time of x. Group 2 of devices 502 includes a set of devices that receive a television signal through satellite with a delay time of y. Group 3 of devices 504 includes a set of devices that receive a television signal over the air with a delay time of z. Then, based on the delay times of each group, steps need to be taken to ensure these delays do not affect the ability of users to play a game of skill which corresponds to a live event shown on television. As described above, a lockout signal is sent at the appropriate time depending on the delay, or a lockout signal is sent, but included with the lockout signal is information for the lockout not to be implemented until the delay is accounted for. This ensures that users with different delays based on their television signal reception path do not receive advantages or disadvantages. Furthermore, in addition to the delays being related to the type of signal reception path such as cable versus satellite, the delays could also be related to other aspects of the signal reception path such as the location of the receiving television or the type of equipment that one television company uses versus another.

Game Production

In the production process, game data is time synchronized precisely with a video stream, utilizing the game production tool.

When playing, the user selects answers (e.g., 1, 2, 3, or 4 or by pressing on the touchscreen) on his cellular phone to answer the question before a time stamped "lockout" signal contained in the game data is received/triggered, precluding further input. The competitor's score is incremented or decremented by software in the game data, depending on whether the competitor is right or wrong with their selection.

The video content and the separately produced overlying game data are then either combined for streaming or broadcast (e.g., into a single data file, maintained as two data files), or an alternate methodology is utilized to ensure that the content is broadcast simultaneously on a single TCP, UDP, 3G, multicast, broadcast or other transmission, utilizing current data compression capabilities. Any appropriate transmission methodology is utilized, including WiFi. The game data contains graphic information separate from the video of the game, such as the selection options, for example "run," "pass," for a game based on a football broadcast. Separate digital sound tracks, one from the television programming (including streamed video, for example, television programming streamed over the Internet to a computing device), and one related to the game programming are also able to be combined for a single transmission. In other words, data is able to be either A) downloaded in advance or B) streamed or C) broadcast. The different types of data: 1) video and audio, 2) graphic game play data, 3) audio enhancements, 4) other types of data, are able to be either combined with each other or sent separately. Therefore, users are able to play simultaneously wherein the video, audio and game play data are received by streaming, broadcasting or downloaded using a simultaneous start time. Users are also able to play on demand wherein the video, audio and game play data are received when requested by streaming, broadcasting or downloaded. Users are also able to practice with on demand games where they are not competing against other players. Regardless of how these discreet pieces of information are delivered to the phone, software resident on the phone ensures that the game play data and audio are synchronized with the video archive.

Game Play

Under this methodology, a user on an ad hoc basis, or as a subscriber to a service or charging the required fee to their cellular telephone bill, indicates their desire to participate in a contest based upon the old television program. The contests have a specific start time, displayed on the cellular phone, such as, for example, "1980 Super Bowl game, 3:15 pm," or in an alternative embodiment, the menu on the cellular phone describes a game played at any time by the cellular phone owner by selecting it from a menu on the cellular phone. Upon selecting this game from the menu, the underlying video and data files are streamed or downloaded to the cellular phone, and the video of the underlying telecast sporting event, game show, or other entertainment program, is displayed on the cellular phone utilizing software permanently or temporarily resident on a cellular phone client designed to display full motion video. A record of what games have been played for an individual subscriber is maintained on the service's server to ensure a subscriber always receives a game they have not played before.

Game Display

The data files which manage the game play, received simultaneously, also utilize software resident on the client for managing the display on the phone's LCD. This game software is able to be a separate "gaming client" or an "all in one" application which addresses the video and game elements, for example for a game based on a streamed broadcast received by the game playing client. The game data graphics are also able to be presented to the player by overlaying the text and symbols over the video content (e.g., television information), or in the alternative, utilize a separate portion of the cellular phone's display for this information, at the option of the producers. An example of this latter approach is the crawling information displayed at the bottom of a television screen containing stock ticker information or the way closed captioning information is displayed on television screens. In the alternative, a picture in picture (PIP) approach is also able to be used to separately display game play information from the underlying video (e.g., streaming video, television footage). In another alternative, the game play information is simply superimposed on top of the video.

Under this invention, the subscriber would play along with the 5- to 15-minute television segment of the game until its conclusion, and would be informed at the end, based upon software resident in the phone, what their total points earned are. In some embodiments, the segments are longer or shorter. By transmitting this game performance information to a central server for compilation, the competition would receive information on how their score relates to the scores achieved by other players of the game. Under an "on demand" game play format, users are able to selectively play against friends, and prizes would generally not be awarded, since the person could play the game as many times as they desire, or obtain the answers from someone who had played.

Games Based on Simultaneous Broadcast Other than a Live Event

In an alternative embodiment, the combined video and game data files produced by the same methodology described above is able to be simultaneously broadcast to all participants at a specific time, such as every 15-minutes, to all of the players who have registered their intention to play a specific game. In this format, these files would be individually streamed, or in the alternative, digitally broadcast, precisely at the same time to all participants. Another approach is to download the data through streaming, broadcast or other downloading technique in advance. Under this approach, the application ensures that the video and game play started at the appropriate time. This is able to be done by signaling a "start" signal to all players.

While game play unfolds in a manner similar to that described in U.S. Pat. No. 4,592,546, a significant difference in this invention and the prior art, is that, in some embodiments, all of the information utilized for the game is pre-produced and combined in a single data file, and received simultaneously by all participating cellular phones broadcast or streamed, to be separated and displayed for simultaneous viewing on a cellular phone by the methods described above. In some embodiments, while the games unfold to the participant in virtually the same manner as a game based upon a live telecast of a sporting event or game show, the cellular phone is not utilized as a receiving device for a second mass media communications synchronized with the underlying telecast, but rather is receiving the single data file or stream which contains both the video of the telecast and the game data information. The video and game data is then separated by application software resident on the cellular phone for simultaneous display on a single color LCD display.

Since all players receive the same game data at the same time, cheating among players, possible with on demand games, is not possible, and prizes can be awarded.

Benefits

While there is a large potential demand for games of skill for prizes based upon the live telecast/streaming of sporting events and syndicated game shows, participation in these games is generally limited to prime time or near prime time viewing on week days, and sporting events on the weekends. The explosion in the popularity of cellular games of short duration indicates that the owners of cellular telephones often find 5-10 minutes during the day to participate in stimulating entertainment work breaks, while commuting to and from work, sometimes even when they are working, amongst other times. The methodologies described herein provide a new and unique form of entertainment. While based on popular television programming, the games are able to be enjoyed either on demand or several times an hour with scheduled start times, since they are generated from any content such as television content (live or archived). The games are ever changing and are based on programming with a proven huge fan audience. This invention provides the highest quality production value at a fraction of the cost of existing video, computer and cellular games. Other games require the skills of graphic artists and designers, and extensive programming to create full motion 3D graphics in attempt to make games like EA Sports® John Madden Football, or Sony's Jeopardy!® games as close to the actual telecast as possible. This invention repurposes the actual television content with the production values and excitement of the original broadcasts of these events at a fraction of the cost.

In some embodiments, the game data is able to be adjusted such that it is synchronized with a video stream. For example, in cooperation with an originator of a video stream (e.g., NFL), the game data is integrated with a streaming game application, which is a separate application from one for broadcast television. Furthering the example, two applications are available to provide similar but different competitions; a first application for use with a video stream and a second application for use with a television broadcast. The applications are similar in that they present questions and/or selections based on a video, but since the streaming video and the television broadcast may have different latencies, the applications operate slightly differently. In some embodiments, a single application is able to determine how the video content is being received (e.g., streaming versus broadcast), and the application is able to handle the latency differences. In some embodiments, an application determines when a stream is received (e.g., using automatic content recognition, watermarks, fingerprints, or any other analysis), and the application estimates and adjusts for an approximate delay for people in different locations. For example, servers or client devices in different parts of the world determine an amount of delay as described herein, and based on that amount of delay either delay presentation of a question/selection or perform other gameplay effects to ensure none of the participants of the game have an unfair advantage over other competitors based on the delay. Furthering the example, if users in San Francisco receive a stream 3 seconds after users in New York, then the presentation of a question for the users in New York is delayed 3 seconds, so that they all receive the question at the same time.

To utilize the methods and systems described herein, for the most part, a participant in a game of skill playing on his/her mobile device does not have to perform any different actions when playing a standard game of skill without the methods and systems described herein. The user simply plays as usual except that with the methods and systems described herein, users with faster or slower connections do not receive any advantages or disadvantages. In embodiments which require user input, the user performs an action, such as recognizing an event to synchronize the game with a live or taped event. For game producers, the methods and systems described herein able to be implemented automatically or performed manually. Automation includes technology to automatically determine the start of an event such as automatically detecting the start of a football game. Manual implementation requires a person to watch an event and respond to that event such as watching a football game and noting when the first play occurs in order to synchronize the "lock out" signal appropriately.

In operation, the methods and systems described herein are able to synchronize separate games of skill which have different latencies based on television signal reception differences, random delays and/or other delays. For live events where all of the participants are watching the event on television and participating in a game of skill corresponding to that live event, delays related to the television signal reception differences have to be handled. Television signal reception differences occur because some televisions receive the live event signal via satellite, while others have cable and still others have something else. The signals do not arrive at the participants at the same time. Therefore, to ensure fair competition, participants are separated into groups or cohorts based on delivery system type, location and other parameters that affect the timing of the signal. Then, using a mechanism described above, the delay for each group is determined. Based on that determined delay, the game of skill is able to be configured with the appropriate timing for a lock out signal, so that each participant has the same amount of time to select an answer and also sees the same amount of the live event as others before the lock out occurs.

For games of skill where there are both participants attending the event live and watching it on television which typically has a few seconds delay, the participants are separated into different competitive groups wherein the attending participants are in one group and the television viewing participants are in another group.

For games of skill using tape recorded events like game shows, the important aspect is ensuring the game of skill corresponds with the televised recorded event. For example, if the game of skill were off by a few seconds, participants could receive multiple choice answers to the wrong questions. Therefore, the methods and systems described herein ensure that the game of skill is synchronized with the taped televised event even when there are different latencies depending on how and where the television signal is being displayed.

Furthermore, although the methods of handling latency have been described above as handling a specific scenario such as delays in television signal reception, the methods are able to be used in conjunction with each other as well. For example, when participants are separated into attending and televised groups because some participants are actually attending an event while others watch it on television, for those watching it on television there will still be issues from location to location and based on the television signal reception, so the latency balancer which handles that aspect of latency is also able to be implemented.

To encourage viewer participation, games, contests and social interactions are able to be synchronized with programming such as television shows or commercials utilizing a second screen such as a cell phone, iPad® or laptop computer. The programming is able to be television programming, Internet programming (e.g. a video displayed on a webpage or mobile device) or any other programming. The gaming is able to be any game such as a game of skill or chance, for example, a scavenger hunt or a treasure hunt.

In some embodiments, the programming and the gaming, contests or social interactions are displayed on a single screen. For example, Google TV™, Apple TV® or another IPTV includes a broadband connection which is capable of connecting to a website which is a companion site to the programming. The display on the television is able to include a Picture-in-Picture (PIP), display space near or around the telecast's picture (e.g., an L-shaped space), graphic overlay, or a split screen. In another example, a two-screen experience includes a wi-fi connection, an open wireless technology (e.g., Bluetooth®) or any other connection from the television to a tablet device such as an iPad®. In some embodiments, a computing device contained within the television couples to a server via the Internet, where the server stores files, displays, graphics, gaming information and/or any other information to be synchronized with the programming, and the application is separately displayed on the same screen for user interaction with the game or contest utilizing a controller for the television.

In a scavenger hunt game, a contest might be based on a member collecting items in a scavenger hunt fashion which appear in TV programs or commercials. The first person or teams to collect all of the items or collecting the most points wins.

In a treasure hunt game, clues to items to collect are given which make sense only upon the viewing of a commercial or program. A viewer enters an item (e.g. from multiple choice options), and the first to accumulate all of the items wins. Hereinafter, all references to a viewer are understood to include a single viewer or a team or teams of viewers. The teams are able to be formed through social networks or on an ad hoc basis. Exemplary formations of teams are able to be found in U.S. Pat. No. 8,002,618 which is hereby incorporated by reference in its entirety. For example, teams are able to be formed and then play any game or contest such as a scavenger hunt, treasure hunt or bingo. The players on each team are able to work jointly or separately to collect items and perform other game play actions.

For example, a treasure hunt game based on the entertainment content or TV commercials provides the first item to search for: "Old English Sheep Dog with red collar." The application in the game mode records an input such as a press of a screen or button by a viewer the instant they observe the dog appear on the TV screen in connection with a participating show or commercial. Executing the required input at this precise time would validate that indeed THE Old English Sheep Dog had been collected. In another version, a score of 1000 points would rapidly be decremented beginning when a treasure hunt object appeared in a TV show or commercial. A rapid input would get 990 points, and someone who had spent time to find their phone might get 450 points for a slower response. The points are decremented incrementally, exponentially or in any other manner.

The viewer receives a prize upon the accumulation of a designated level of points, or in a money contest such as a $1 Million national contest, the first viewer to achieve a designated point's level wins the grand prize.

In another example of a game, a bingo-like game is presented where, instead of letters and numbers being used for a player's board, each player's board includes specific objects, characters, events or other items contained in a commercial, television series, show, event or other programming. The items are each collected by pressing a button within a prescribed amount of time (e.g., 5 seconds) of appearance of the object on the television. The first person to fill the card wins. Filling the card is able to mean filling the card fully or any other bingo-related definition of filling such as achieving a vertical, horizontal or diagonal line. For example, a player's card includes 25 slots, arranged in a 5×5, grid with items such as a Ford F-150, a Ford F-250, a Ford Focus, a Ford Mustang, an engine, and twenty other items. When the player watches a Ford commercial, the player sees a Ford Focus. The player then presses a button within the allotted time, and that slot in his board is filled. Each player's board is monitored, and when it is determined that a player has achieved a filled board, the player is declared the winner. In some embodiments, the other players are notified, and the game ends, and in some embodiments, additional winners are able to be determined (e.g. second and third place).

The system implements precise synchronization of a second screen and programming. The synchronization is able to be implemented using any methodology, such as utilizing the teachings of latencies. Exemplary methodologies for synchronizing have been described herein and any other methodologies of synchronizing are possible.

Figure 6:
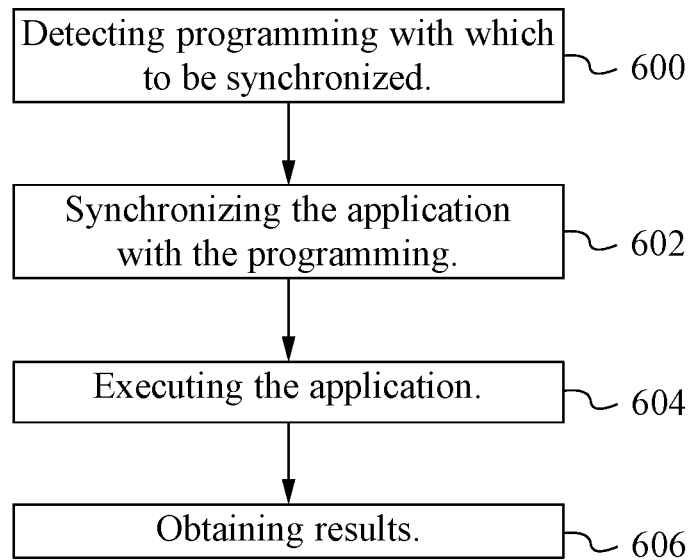
FIG. 6 illustrates a flowchart of a method of implementing a game synchronized with programming according to some embodiments.

FIG. 6 illustrates a flowchart of a method of implementing a game synchronized with programming according to some embodiments. In the step 600, an application detects programming with which to be synchronized. In the step 602, the application synchronizes with the programming to provide application data such as gaming data. In the step 604, based on user responses, the game is executed. For example, a scavenger hunt game, treasure hunt or other game based on the observation of something contained in a television broadcast game is executed. In some embodiments, in the step 606, scores are tallied, prizes are awarded and/or other results are obtained. In some embodiments, the order of the steps is modified. In some embodiments, fewer or more steps are implemented.

Detection and synchronization are able to be implemented in any manner. The efficacy of the games depend on each player having an opportunity to obtain the maximum number of points achievable by entering their input as soon as possible after the specified item appears on the TV screen. The following provides examples of detection and synchronization. Existing events in the telecast are used as synchronization points or start points for previously downloaded data files to a mobile client, as well as a watermark, fingerprint not detectable by the viewer. A synchronization point is a visible or audible event located within the telecast. A synchronization point for a live telecast is contained in audio or video within the telecast. Information is inserted in a Vertical Blanking Interval (VBI) or digital equivalent of a show and tracked online in real-time. Information is embedded in the telecast and tracked online in real-time. Determining a start time of the telecast includes using a recognizable signal recognizable by a mobile device. A start time of a commercial is delivered using a recognizable signal recognizable by a mobile device. A plurality of synchronization points are used by a client to continuously check to ensure pre-produced data files are synchronized with the telecast. Inserted audio or video is used to continuously check to ensure the pre-produced data files are precisely synchronized on the client with the telecast. Inserted audio or video is used by a client to continuously check to ensure the pre-produced data files are precisely synchronized on the client with the telecast. The inserted audio or video is used by a server to continuously check to ensure the pre-produced data files are precisely synchronized on the client with the telecast.

In some embodiments, synchronizing includes determining an amount of delay to precisely synchronize between the game stored on a mobile device and the receipt of the program presented on a television and substantially equalizing presentation of the game of skill or chance with programming or a commercial contained in a telecast through adjustment for the amount of delay of the telecast. Substantially equalizing includes equalizing receipt of lock out events relative to a televised event triggering a lock out. Synchronizing includes substantially equalizing a participant delay to ensure the participants each receive the game of skill or chance at substantially the same time. Synchronizing includes determining participant latency based on specific participant latencies and synchronizing the game of skill or chance for each of the participants. Synchronizing includes determining the latencies in receiving a streamed broadcast of an event and synchronizing game data to all recipients of the one or more streamed broadcasts of the event. Synchronizing includes utilizing an audio or video recognition system on a client with online access to the telecast's game control server. Synchronizing includes using added audio or video events in the telecast as synchronization points. A plurality of synchronization points within audio or video are used by software on a client in connection with a server to continuously monitor the telecast to ensure the game of skill or chance played on the client is precisely synchronized with the telecast. An artifact is inserted into the telecast recognizable by an audio receiver in a mobile device which is utilized to start and continually keep the game of skill or chance synchronized with the telecast.

Participants include ad hoc or preexisting groups of friends competing in a separate competition in disparate physical locations. The synchronization points are the audio or video data for the telecast residing on a server online with a mobile device. The participants constitute ad hoc or existing groups of geographically dispersed friends participating in a separate game of chance or skill. The participants are ad hoc or previously organized groups of friends competing against each other in a separate contest. Equalizing the participants includes time stamping the amount of delay on game-related data. Establishing the amount of delay is through an automated system which samples an audio or video track of a satellite, cable or over the air broadcast television signal, linked to a game server, to provide information related to a precise arrival of an underlying television picture.

Figure 7:
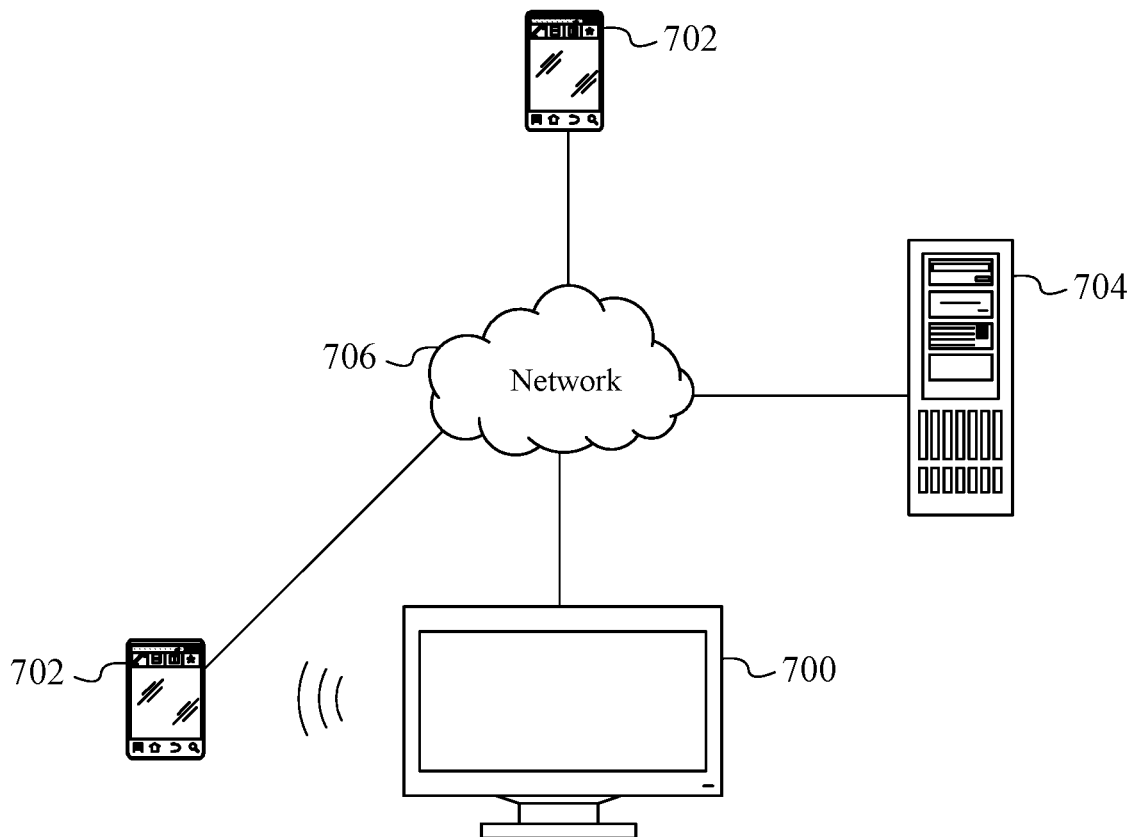
FIG. 7 illustrates a system for implementing a game synchronized with programming according to some embodiments.

FIG. 7 illustrates a system for implementing a game synchronized with programming according to some embodiments. The system includes several devices such as a viewing device 700, a secondary device 702, a server device 704 and a network 706. For example, a user views programming on the viewing device 700 (e.g. a television) and participates in a scavenger hunt game on the secondary device 702 (e.g. a smart phone). The game on the secondary device 702 is synchronized with the programming of the viewing device 700. In some embodiments, the synchronization takes place using a program on the secondary device 702, and in some embodiments, the server device 704 is used for synchronization. The network 706 is able to be any network such as the Internet, a cellular network or a combination of networks. Fewer or additional devices are able to be included within the system.

To utilize the synchronized gaming and programming, a user initiates a game which automatically synchronizes with the programming. In some embodiments, the programming initiates the game. For example, a user is watching television and a trigger in the television signal automatically starts the game. The user plays the game as any game would be played. For example, if the user is playing a scavenger hunt game, the user searches/looks for items and indicates when the items are found. If the user is playing a treasure hunt game, the user uses clues to locate an item. Points and/or prizes are awarded based on the timing of the user input/selections (e.g. a faster response receives more points than a slower response).

In operation, the synchronized gaming and programming is able to synchronize programming with a game presented on a second device. In some embodiments, the synchronized gaming and programming is also able to synchronize participants, for example by equalizing the amount of delay or sending a lockout signal at the appropriate time based on the amount of delay.

Although a scavenger hunt and a treasure hunt have been described herein, any other game is able to be played in conjunction with programming.

FIG. 8 illustrates a system for implementing a game synchronized with programming according to some embodiments. Content from a content source 800 is received at a game production center such as at a server 802. The content source 800 is able to be a venue (of a sporting event), a device at a venue or a broadcasting company device. The content is able to be received as streaming content or any other audio and/or video coming from the content source 800. For example, the content is able to be received via a television broadcast or an audio feed from a cellular phone present at a venue. A delay in the reception of the content is able to be determined (e.g., measured) as described herein. The delay amount is used to synchronize game data with the content or adjust the game data (e.g., adjust the time the game data is sent or triggered) at the server 802. In some embodiments, only the time-adjusted game data is sent from the server 802 to user devices 804 which display the game data (e.g., on web-connected televisions, laptops). In some embodiments, the user devices 804 only display the game data (without displaying the content), and in some embodiments, the same user devices display the content as well (e.g., smart television displays the game data and the content using overlays, picture-in-picture or another implementation). For example, the user devices 804 which only receive the game data display the game data, and content 806 (e.g., a football game telecast) is displayed on a television or another user device. Other devices are able to be implemented in the system as well. In other embodiments, the user is physically observing a live event, while also receiving the game data.

FIG. 9 illustrates a system for implementing a game synchronized with programming according to some embodiments. Content from a content source 900 is received at a game production center such as at a server 902. The content source 900 is able to be a venue (of a sporting event), a device at a venue or a broadcasting company device. The content is able to be received as streaming content or any other audio and/or video coming from the content source 900. For example, the content is able to be received via a television broadcast or an audio feed from a cellular phone present at a venue. A delay in the reception of the content is able to be determined (e.g., measured) as described herein. The delay amount is used to synchronize game data with the content and combine the game data with the content at the server 902. In some embodiments, the synchronized, combined game data and content is sent from the server 902 to user devices 904 which display the game data with the content (e.g., on web-connected televisions, laptops). In some embodiments, the same user devices display the game data with the content (e.g., smart television displays the game data and the content using overlays, picture-in-picture or another implementation). Other devices are able to be implemented in the system as well.

As described herein, users/participants are able to be separated into groups or cohorts based on a variety of factors such as how the users receive content (e.g., television broadcast via cable versus streaming content on a computer). In some embodiments, when a user or a group of users receives content and/or gameplay information too slowly, the user(s) are notified and prevented from participating in a game. For example, if a user is receiving a football game and gameplay data over a Digital Subscriber Line (DSL), and the user device (e.g., smart phone) or a server determines that the football game content and/or gameplay data is received with a delay that exceeds a threshold, then the server and/or user device notifies the user that the user should find a different content path (e.g., please locate a streaming source which has less delay). Determining that the content path is too slow or has too much delay is able to be performed in any manner such as comparing the timing of specific events in content with timing of specific events in a distribution of content that is known to have little or no delay, or sending packets from the server with a timestamp and comparing the timestamp with receipt data to determine an amount of delay. The determination of delay is able to occur on the user device, the server or a combination thereof. In some embodiments, a largest group/cohort of users is determined based on delay determinations, and only the largest group/cohort is permitted to play. For example, users who receive a broadcast/stream too quickly or two slowly are blocked from participating in a competition or are permitted to participate in a separate competition. Furthering the example, delays for samples/groups of users are determined as described herein, and the samples/groups are classified (e.g., under 1 second delay, 2-5 second delay, 6-10 second delay and 10+ second delay), and if the under 1 second delay group has 1,000 users, the 2-5 second delay group has 1,000,000 users, the 6-10 second delay group has 500,000 users and the 10+ second delay group has 1,000 users, then the 2-5 second delay group has the most users and all of the other users are excluded or placed in one or more separate groups. In some embodiments, multiple groups are able to be combined (e.g., 2-5 second delay group and the 6-10 second delay group) to enable more users to participate.

In some embodiments, instead of grouping users into cohorts/groups based on their transmission/reception system (e.g., cable, DSL, satellite) and/or delivery method (e.g., broadcast, streaming), users are grouped based on the determined delay. For example, User A receives a telecast with approximately a 7 second delay, and User B streams the same content, which also has approximately a 7 second delay. Therefore, even though they receive the content in a different manner, since the delay is the same, they are able to be grouped in the same cohort.

In some embodiments, content (e.g., a television broadcast) is received at a server and the content is combined with game data (e.g., gameplay such as questions), and the combined server and game data are streamed to user devices. The combining of the content and the game data is able to be performed in any manner such as receiving the content, and streaming the content to user devices while also adding packets of game data to the stream. In some embodiments, the game data is added to the stream at appropriate times to ensure the game is synchronized with the content. For example, the server implements a synchronization feature such as using ACR to ensure the game data is synchronized with the content. In some embodiments, the synchronization of the content with the game data is performed at the client device or another device using an implementation as described herein such as ACR.

In some embodiments, streaming content (e.g., video of a sports competition) and a game of skill or chance are combined into a single stream and are received by a single application for display on a single screen (e.g., mobile device) with lockout signals and other limitations described herein.

For example, a stream of a live or taped broadcast distributed from a live or streamed source (e.g., over the air, cable, broadcast, satellite, Over The Top (OTT)), is received (e.g., at a sever or at a mobile device). Streaming content involves utilization of the Internet and/or any other network (e.g., cellular network). A game of skill or chance is produced, where the game is based on observation of the stream. The game of skill or chance is produced on the same or a different server than where the content is received. The produced game is joined/merged with the streamed event/content, and any latencies are adjusted for so that the game data is synchronized with the streamed event/content and transmitted to a web-connected client. The streaming content is displayed simultaneously with the game data utilizing synchronized lockouts. The streaming content and game data are able to be displayed in any manner such as game data overlaid on the streaming content or Picture-in-Picture, and in some embodiments, the game data disappears when not utilized.

In another example, the content is viewed in any manner including streaming. A game is produced on the same server that provides the content or a separate server. The content and the game are combined and streamed together.

In another example, a streamed content is intercepted and used to produce a game of skill or chance based on the observation of the streamed content. The streamed content and the game of skill or chance are combined and sent to a client device via a cellular/web transmission with synchronization and lockout implementations. The streamed content and the game of skill are played on a single device.

In some embodiments, determined delays are based on pre-measured (e.g., measured before a game is implemented) or known propagation delays for cohorts in a similar state or metropolitan area with different methods of signal delivery such as cable, satellite, broadcast, streaming or a combination thereof. For example, it is known that a cable company implements a 7 second delay (compared to live), and a satellite company implements a 10 second delay. In addition to pre-measured or known propagation delays, any other delays or combinations of delays are able to be implemented. For example, a delay is pre-measured for a specific delivery implementation, but then the delay is continuously measured to ensure the delay remains as determined in the pre-measurement. The timing of lockouts and/or other effects are able to be implemented based on any of the determinations of the delays. Any delay (e.g., artificially imposed or based on technological issues) is able to be detected/determined and compensated for by modifying gameplay such as affecting when lockout signals are triggered/sent.

In some embodiments, latencies for each user or samples of users are determined and compared. For example, a server-side or client-side application is able to determine specific points in a broadcast and when they are received. Furthering the example, the application determines when a pitch occurs in a baseball game broadcast by any of the synchronization methods described herein such as ACR. Additionally, determination of live information is also performed (e.g., by a person attending a live event or receiving information from the live event without any delay). The information determined is able to be compared, such as: live event first pitch occurs at Time 7:30:00 p, and for User A at Time 7:30:05p and for User Z at Time 7:30:30 p. The difference between User A (earliest content receipt) and User Z (slowest content receipt) is 25 seconds. Therefore, the game could send a lockout after 35 seconds (compared to the live event) which would give User A 30 seconds to respond and User Z 5 seconds to respond. Although there is a discrepancy, this may be permissible. However, if the questions come in rapid succession (e.g., every 30 seconds for each pitch in a baseball game), then User Z may not have any time to respond, so User Z is informed of the issue and is not permitted to play. In some embodiments, to level the field where there is a discrepancy in receipt of content (but not to the point where a user has no time to respond), the question may not be sent or displayed until the slowest content receipt user receives the specified content. For example, a live event first pitch occurs at Time 7:30:00 p, but for User A the pitch occurs at Time 7:30:05 p and for User Z at Time 7:30:10 p. To ensure the users have the same amount of time to respond to a question, the question is displayed at 7:29:50 p and a lockout signal is sent to all of the users at Time 7:30:00 p, or the question is displayed at 7:29:50 p for User A and the lockout signal is triggered/sent at 7:30:00 p for User A, but the question is displayed at 7:29:55 p for User A and the lockout signal is triggered/sent at 7:30:05 for User Z, so they are both locked out 5 seconds before the actual pitch. Any combination of displaying the question and locking out users is possible. Additionally, although the examples above specify User A and User Z, it is understood that User A or User Z could be a group or sample of users with the same delay/latency.

As described herein, delay/latency adjustment including sending lockout signals at appropriate times (e.g., to prevent a user from having an unfair advantage) for a corresponding game of skill or chance is able to be implemented with any content distribution/reception (broadcast, cable, streaming, over the air, satellite) and is able to be implemented on the server, a client device or a combination thereof. The content and the game are able to be received on the same device (e.g., simultaneously receiving video content and game data) or different devices. In some embodiments, viewers are separated depending on content reception (e.g., how the viewers receive event content) and separate games are played based on the separate groups. For example, a game/competition occurs only for users who receive a football game via a television broadcast, and a separate game/competition occurs only for users who receive the football game via streaming.

In some embodiments, in addition to or instead of receiving video content (e.g., a television broadcast), a user device receives statistical information (e.g., live sports data feeds from a source such as Stats.com). For example, the statistical information is received on the user device which updates text and/or graphical information such as the number of runs, hits, outs, strikes/balls, and so on for each baseball team. The user device receiving the statistical information is able to be the same device or a different device than the one for participating in the game of skill or chance.

In some implementations, the statistical information may be received before the video content (e.g., the statistical information is received at a user device within 1 second from when it actually occurs live, and the video content is received at the user device in 7 seconds from when it occurred live). In some embodiments, the difference in receipt time is computed (similar to the calculation of other delays described herein) to account for such a difference. For example, if the difference between video receipt and statistical information receipt is 6 seconds (7 seconds-1 second), then a system (e.g., server, other network device, user device or a combination thereof) is able to delay transmission and/or display of the statistical information. For example, the game server receives the statistical information and then holds the statistical information for 6 seconds before passing the statistical information on to the user device so that the statistical information and the video content arrive at the same time (or approximately the same time). In another example, the user device receives the statistical information in 1 second, but then the user device (e.g., the game application) holds the statistical information and does not display the statistical information until another 6 seconds have passed so that the video content and statistical information are displayed at the same time (or approximately the same time). In some embodiments, the statistical information is delayed to be displayed before or after the video content. For example, in some implementations, the statistical information is not updated and displayed until 2 seconds after the video content is displayed. In some embodiments, the delay amount of the statistical information is static, and in some embodiments, the delay amount is dynamic. For example, a producer is able to adjust the delay amount based on analyzing the video propagation delays. The delay amount is able to be different depending on varying factors such as how the video content is received (e.g., cable, satellite, over the air) or the location of the user device (e.g., rural versus urban or State X versus State Y). Thus, the game server is able to distribute the statistical information accordingly to each cohort or group of users. The amount of delay could be based on other factors as well. In some embodiments, the amount of delay is automatically detected and/or the statistical information is synchronized with the video content. For example, using any of the synchronization implementations described herein, such as watermarking, footprints, and/or automatic content recognition, the server and/or the user device synchronize the statistical information with the video content. For example, the server determines using automatic content recognition that a strike was just called with Player X batting, so the statistical information of a strike is updated/displayed.

In some embodiments, a lockout signal is sent or triggered based on the receipt of the statistical information. For example, when the statistical information is received at a user device, a lockout signal is triggered. Furthering the example, the earliest receipt of the statistical information triggers the lockout signal (e.g., a lockout signal is sent to all user devices and/or an application prevents a selection of a response after the lockout is triggered).

FIG. 10 illustrates a flowchart of a method of utilizing statistical information with a game of skill or chance according to some embodiments. In the step 1000, statistical information is received. The statistical information is able to be received from any source such as stats.com. The statistical information is received at any device such as a server and/or user devices. In the step 1002, timing information related to the statistical information is computed. Computing the timing information is able to include computing the time from when video content is received and when the statistical information is received at user devices. Computing the timing information is able to include computing the time from when a live action occurs (e.g., a pitch called a strike) to when the statistical information is received at the server or the user devices (or specific user devices). For example, the statistical information may be received at different user devices at different times. In the step 1004, an action is taken based on the timing information related to the statistical information. For example, transmission of the statistical information from the server to the user devices is delayed (possibly different amounts of delay for different devices), or display of the statistical information on the user devices is delayed. In another example, lockout signals are based on the timing information and/or when the statistical information is received at user devices. In some embodiments, fewer or additional steps are implemented. In some embodiments, the order of the steps is modified.

To address the many problems facing massive real-time, distributed gaming as described herein, many companies have implemented various technological solutions such as limiting the number of users permitted to play at a certain time or providing faster servers or other networking equipment. Time-sensitive distributed gaming faces additional problems such as ensuring players do not have any unfair competitive advantages such as providing answers/selections after a designated time. Others have addressed the timing problems by asking questions well in advance, so that the users answer the questions or make their selections well before any advantageous information is revealed. By utilizing time-sensitive lockouts as described herein, which lock out players based on some threshold (e.g., a time, a detected action, a user-triggered action), improper competitive advantages and cheating are avoided. Efficiently locating participants is another challenge of distributed gaming. As described herein, social networking is able to be utilized to efficiently find and invite participants to the distributed game. By utilizing social networking, users with common interests are able to be invited which increases the likelihood of participation which also reduces the amount of network traffic as there will be fewer people who are contacted who reject or disregard the invitation. A solution to the problem of large amounts of network data involves utilizing multiple servers which are able to be positioned appropriately to serve users based on geographic proximity, as described herein. Another solution is to utilize distributed computing such as enabling the end user devices to process results and scoring, as described herein. For distributed gaming based on received external content (e.g., a telecast) where users may receive the external content at slightly different times (e.g., based on transmission delays due to technological issues such as timing differences of servers, switches, routers or distribution devices), a way of equalizing the differences using technological solutions (e.g., calculating a delay based on timestamps of when content is sent and received, or comparing receipt times of content for different devices) ensures the game is executed fairly and properly. Furthermore, a game in which a group of participants is at a complete disadvantage (e.g., they receive data 7 seconds later than everyone else) may lose a substantial number of participants, as no one wants to participate in an unfair game. Therefore, implementations described herein of equalizing the receipt of content in any manner such as by adding delays or providing lockouts at appropriate times based on transmission differences are technological solutions to technological problems.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a memory of a device comprising:
    a. determining a first delay amount for a transmission of content for a first user;
    b. determining a second delay amount for the transmission of the content for a second user;
    c. calculating a delta between the first delay amount and the second delay amount; and
    d. excluding the second user from a game of skill or chance or other entertainment when the delta between the first delay amount and the second delay amount is greater than a threshold.

2. The method of claim 1 wherein the first delay amount is a shortest delay amount, and the second delay amount is a longest delay amount.

3. The method of claim 1 wherein the transmission of content includes at least one of television broadcast, via over the air, cable, satellite, or streaming.

4. The method of claim 1 wherein the game of skill or chance or other entertainment is related to the content.

5. The method of claim 1 wherein the game of skill or chance or other entertainment is synchronized with the content.

6. The method of claim 1 wherein the device is an Internet-connected device.

7. The method of claim 1 wherein the device comprises a mobile device.

8. The method of claim 1 wherein the device comprises a server.

9. The method of claim 1 wherein the game of skill or chance or other entertainment and the content are displayed on the device.

10. The method of claim 1 wherein the content and the game of skill or chance or other entertainment are synchronized using watermarking or fingerprinting.

11. The method of claim 1 wherein determining the first delay amount and determining the second delay amount comprise comparing times of receipt of the content at user devices.

12. The method of claim 1 further comprising substantially equalizing presentation of the game of skill or chance or other entertainment with the content for users with different amounts of delay.

13. The method of claim 12 wherein substantially equalizing includes equalizing receipt of lock out events relative to the content triggering a lock out.

14. A device comprising:
    a. a memory for storing an application, the application configured for:
        i. determining a first delay amount for a transmission of content for a first user;
        ii. determining a second delay amount for the transmission of the content for a second user;
        iii. calculating a delta between the first delay amount and the second delay amount; and
        iv. excluding the second user from a game of skill or chance or other entertainment when the delta between the first delay amount and the second delay amount is greater than a threshold; and
    b. a processor coupled to the memory, the processor configured for processing the application.

15. The device of claim 14 wherein the first delay amount is a shortest delay amount, and the second delay amount is a longest delay amount.

16. The device of claim 14 wherein the transmission of content includes at least one of television broadcast, via over the air, cable, satellite, or streaming.

17. The device of claim 14 wherein the game of skill or chance or other entertainment is related to the content.

18. The device of claim 14 wherein the game of skill or chance or other entertainment is synchronized with the content.

19. The method of claim 14 wherein the device is an Internet-connected device.

20. The device of claim 14 wherein the device comprises a mobile device.

21. The device of claim 14 wherein the device comprises a server.

22. The device of claim 14 wherein the game of skill or chance or other entertainment and the content are displayed on the device.

23. The device of claim 14 wherein the content and the game of skill or chance or other entertainment are synchronized using watermarking or fingerprinting.

24. The device of claim 14 wherein determining the first delay amount and determining the second delay amount comprise comparing times of receipt of the content at user devices.

25. The device of claim 14 further comprising substantially equalizing presentation of the game of skill or chance or other entertainment with the content for users with different amounts of delay.

26. The device of claim 25 wherein substantially equalizing includes equalizing receipt of lock out events relative to the content triggering a lock out.

27. A server device comprising:
    a. a memory for storing an application, the application configured for:
        i. comparing a first delay amount in transmission of content for a first device with a delay threshold;
        ii. comparing a second delay amount in transmission of content for a second device with the delay threshold;

iii. excluding the first device from a game of skill or chance or other entertainment when the first delay amount is greater than the delay threshold;
iv. excluding the second device from a game of skill or chance or other entertainment when the second delay amount is greater than the delay threshold; and
b. a processor coupled to the memory, the processor configured for processing the application.

28. The device of claim 27 wherein the transmission of content includes at least one of television broadcast, via over the air, cable, satellite, or streaming.

29. The device of claim 27 wherein the game of skill or chance or other entertainment is related to the content.

30. The device of claim 27 wherein the game of skill or chance or other entertainment is synchronized with the content.

31. The device of claim 27 wherein the content and the game of skill or chance or other entertainment are synchronized using watermarking or fingerprinting.

\* \* \* \* \*